United States Patent
Sakurazawa et al.

(10) Patent No.: US 7,981,489 B2
(45) Date of Patent: Jul. 19, 2011

(54) OPTICAL COMPENSATION SHEET AND LIQUID CRYSTAL DISPLAY DEVICE

(75) Inventors: Mamoru Sakurazawa, Minami-ashigara (JP); Akihiro Matsufuji, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 993 days.

(21) Appl. No.: 11/884,754

(22) PCT Filed: Feb. 22, 2006

(86) PCT No.: PCT/JP2006/303818
§ 371 (c)(1),
(2), (4) Date: Aug. 21, 2007

(87) PCT Pub. No.: WO2006/090887
PCT Pub. Date: Aug. 31, 2006

(65) Prior Publication Data
US 2008/0165312 A1    Jul. 10, 2008

(30) Foreign Application Priority Data
Feb. 23, 2005    (JP) .................................. 2005-047647

(51) Int. Cl.
*G02F 1/13363*    (2006.01)
(52) U.S. Cl. ......................... 428/1.33; 349/117; 349/118
(58) Field of Classification Search .................... 428/1.3, 428/1.33; 349/117–122
See application file for complete search history.

(56) References Cited

U.S. PATENT DOCUMENTS

| | | | |
|---|---|---|---|
| 6,285,430 B1 | 9/2001 | Saito | |
| 6,630,973 B1 * | 10/2003 | Matsuoka et al. | 349/117 |
| 7,060,333 B2 * | 6/2006 | Takeuchi et al. | 428/1.3 |
| 7,105,212 B2 * | 9/2006 | Ito | 428/1.3 |
| 7,166,339 B1 * | 1/2007 | Mori et al. | 428/1.33 |
| 7,504,139 B2 * | 3/2009 | Kawanishi et al. | 428/1.54 |
| 7,586,562 B2 * | 9/2009 | Ito | 349/98 |
| 7,630,031 B2 * | 12/2009 | Ito | 349/96 |
| 2004/0096594 A1 * | 5/2004 | Takeuchi et al. | 428/1.2 |
| 2005/0106334 A1 * | 5/2005 | Kubo et al. | 428/1.31 |

FOREIGN PATENT DOCUMENTS

| | | |
|---|---|---|
| EP | 0 911 656 A2 | 4/1999 |
| JP | 2000-275434 A | 10/2000 |
| JP | 2001-116926 A | 4/2001 |
| JP | 2002-71954 A | 3/2002 |
| WO | WO 00/65384 A1 | 11/2000 |
| WO | WO 03/018672 A1 | 3/2003 |

OTHER PUBLICATIONS

JPO Website Machine English Translation of JP2004-050516, Kawanishi et al., Feb. 19, 2004.*
JPO Website Machine English Translation of JP2000-275434, Matsuoka et al., Oct. 6, 2000.*
International Search Report, Japan Patent Office, May 26, 2006.
Official Action dated Feb. 1, 2011, issued by the Japanese Patent Office in corresponding Japanese Patent Application No. 2006-027508, and English language translation of the Official Action.

* cited by examiner

*Primary Examiner* — Sophie Hon
(74) *Attorney, Agent, or Firm* — Buchanan Ingersoll & Rooney PC

(57) ABSTRACT

An optical compensation sheet, which contains a cellulose acylate film that contains 1 to 20 parts by mass of a retardation controlling agent, to 100 parts by mass of a cellulose acylate, wherein the retardation controlling agent comprises at least two compounds different in Re/Rth ratios each other; and a liquid crystal display device, which contains the optical compensation sheet.

11 Claims, No Drawings

OPTICAL COMPENSATION SHEET AND LIQUID CRYSTAL DISPLAY DEVICE

This application is a 371 of PCT/JP2006/303818 filed Feb. 22, 2006

TECHNICAL FIELD

The present invention relates to an optical compensation sheet and a liquid crystal display device; and particularly to an optical compensation sheet made of only one cellulose acylate film, and a polarizing plate and a liquid crystal display device using the optical compensation sheet.

BACKGROUND ART

Among cellulose films, a cellulose acetate film has higher optical isotropy (a lower retardation value) than other polymer films. Therefore, it is common to use a cellulose acetate film in applications requiring optical isotropy, e.g. for a polarizing plate. On the other hand, it is demanded that optical compensation sheets (retardation films (or phase-contrast films or phase difference films)) for use, for example, in a liquid crystal display device, have optical anisotropy (high retardation value), on the contrary. Therefore, a synthetic polymer film, e.g. a polycarbonate film or polysulfone film, which has a high retardation value, is commonly used as the optical compensation sheet.

As described above, in the technical fields of optical materials, a synthetic polymer film is used when it is required for a polymer film to have optical anisotropy (high retardation value), and a cellulose acetate film is used when it is required for a polymer film to have optical isotropy (low retardation value), in general.

However, in these days, another-type of cellulose acetate film having a high retardation value is demanded, so that it can also be used in applications for which optical anisotropy is required, and technologies to meet this are proposed (for example, European Patent Application Publication (Laid-Open) No. EP0911656A2). In the above EP0911656A2, an aromatic compound having at least two aromatic rings, and particularly a compound having a 1,3,5-triazine ring, is added, and stretching is carried out, in order for a cellulose triacetate film to have a high retardation value, in practice.

Generally, it is known that a cellulose triacetate is a high-molecular raw material that can be stretched (or orientated) with difficulty, and it is difficult to make the cellulose triacetate have a large birefringence. However, in the above EP0911656A2, additives are orientated at the same time by stretching, thereby making it possible to increase birefringence and attaining a high retardation value. This film has such a merit that an inexpensive and thin-film liquid crystal display device can be obtained, because this film can double as a protective film of a polarizing plate.

In recent years, making thinner films for liquid crystal cells has been essential to creating lighter-weight liquid crystal displays, reducing manufacturing cost of liquid crystal displays, or increasing response speed of liquid crystal displays. The optical performance required for an optical compensation sheet is, therefore, a higher Re retardation value, and it has become necessary to provide a film having a lower Rth retardation value.

However, the present inventors, having made earnest studies as to the method disclosed in EP0911656A2, have, as a result, clarified that this method has the problem that it is difficult to set the Re retardation value and Rth retardation value individually, they cannot be set compatibly by the aforementioned method. There are, besides the above EP0911656A2, patent documents, for example JP-A-2001-116926 ("JP-A" means unexamined published Japanese patent application), which disclose techniques concerning the optical performance of a phase-contrast film. In the publications, no method of making a desired Re value and a desired Rth value compatible with each other is clearly described.

In the case of considering that the thickness of a film is fixed, the retardation of the film is determined by the refractive index and amount of a raw material and the orientation state. In the method disclosed in the above EP0911656A2, the retardation of the film is determined by the three-axis refractive indexes and orientation state of the cellulose triacetate, as well as the refractive index, amount to be added, and orientation state of the disk-like compound serving as an additive.

The Re retardation value and the Rth retardation value are both defined as refractive indexes in three-axis directions, and therefore the ratio Re/Rth is mostly determined by an additive that largely contributes to the development of retardation. By investigating the Re/Rth ratio vs. the stretch ratio (or orientation ratio), it was found that both are proportional to each other, and the Re/Rth ratio is increased as the stretch ratio is increased. In the case of varying the amount to be added, the same proportional relation is also obtained: The Re/Rth ratio is increased as the amount to be added is increased. The gradient of the Re/Rth ratio to the stretch ratio is determined by the raw material to be added. It was found that, in the case of the disk-like compound described specifically in the above EP0911656A2, the gradient is small.

The orientation states of cellulose triacetate and additives, which orientation determines the retardation value, differ depending on the stretching method. Generally, a roll stretching method and a tenter stretching method are known, as examples of a monoaxially stretching method. In the former method, the width of a film is shrunk, so that Re tends to be developed. In the latter method, a film is stretched in the transverse direction under the condition that the conveying direction is limited, and Re is scarcely made large. As a result, the Re/Rth ratio to the stretch ratio is smaller in the latter case than in the former case. Because the tenter stretching method has a tendency to decrease the dispersions of film thickness and optical performances within a given plane, it is suitable as a method of producing an optical compensation sheet for a liquid crystal display device. When this method is applied to the aforementioned disclosed example, the increment of the Re/Rth ratio is about 0.01 or less, per 1% of the stretch ratio. When the target value of Re is close to the target value of Rth and the Re/Rth ratio is about 0.5, the stretch ratio must be 50% or more. It is difficult to actually attain this stretch ratio stably in the case of cellulose triacetate film resistant to stretching.

Also, as to the amount to be added, it is difficult to attain the optical performances to be intended by a possible increase in the amount to be added.

Other and further features and advantages of the invention will appear more fully from the following description.

DISCLOSURE OF INVENTION

The present inventors have found that, to enlarge the controllable region of the Re/Rth vs. the stretch ratio in the case of attaining optimum Re and Rth values by a tenter stretching method as described above, the controllable region of the Re/Rth vs. the stretch ratio can be enlarged, by using a disk-like compound, as described in the above EP0911656A2, and a compound represented by the following formula (II), together as additives. The inventors have also found that an optical compensation sheet having an optical performance that cannot be attained by conventional methods, can be obtained. The present invention was thus attained based on these findings.

According to the present invention, there is provided the following means:

(1) An optical compensation sheet, comprising a cellulose acylate film that contains 1 to 20 parts by mass of a retardation controlling agent, to 100 parts by mass of a cellulose acylate, wherein the retardation controlling agent comprises at least two compounds different in Re/Rth ratios each other.

(2) The optical compensation sheet according to Item (1), wherein the optical compensation sheet comprises a cellulose acylate film stretched at a stretch ratio of 3 to 100%.

(3) The optical compensation sheet according to Item (1) or (2), wherein the content of the two compounds contained in the retardation controlling agent is 1 to 20 parts by mass in sum, to 100 parts by mass of the cellulose acylate.

(4) The optical compensation sheet according to any one of Items (1) to (3), wherein one of the two compounds contained in the retardation controlling agent exhibits a Re/Rth ratio of less than 0.35, and the other exhibits a Re/Rth ratio of not less than 0.35.

(5) The optical compensation sheet according to Item (4), wherein the compound exhibiting a Re/Rth ratio of less than 0.35 is represented by formula (I):

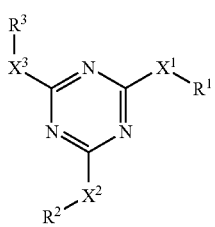

Formula (I)

wherein $X^1$ represents a single bond, —$NR^4$—, —O—, or —S—; $X^2$ represents a single bond, —$NR^5$—, —O—, or —S—; $X^3$ represents a single bond, —$NR^6$—, —O—, or —S—; $R^1$, $R^2$ and $R^3$ each independently represent an alkyl group, an alkenyl group, an aryl group, or a heterocyclic group; and $R^4$, $R^5$ and $R^6$ each independently represent a hydrogen atom, an alkyl group, an alkenyl group, an aryl group, or a heterocyclic group.

(6) The optical compensation sheet according to Item (4), wherein the compound exhibiting a Re/Rth ratio of less than 0.35 is represented by formula (II):

Formula (II)

wherein $Ar^1$, $Ar^2$, and $Ar^3$ each independently represent an aryl group or an aromatic heterocyclic group; $L^1$ and $L^2$ each independently represent a single bond or a divalent linking group; n represents an integer of 3 or more; and a plurality of the $Ar^2$ moieties may be the same or different, and a plurality of the $L^2$ moieties may be the same or different.

(7) The optical compensation sheet according to Item (4), wherein the compound exhibiting a Re/Rth ratio of not less than 0.35 is represented by formula (III):

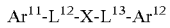

Formula (III)

wherein $Ar^{11}$ and $Ar^{12}$ each independently represent an aromatic group; $L^{12}$ and $L^{13}$ each independently represent a divalent linking group selected from the group consisting of an alkylene group, —O—, —CO—, and a combination thereof; and X represents 1,4-cyclohexylene, vinylene, or ethynylene.

(8) The optical compensation sheet according to any of Items (1) to (7), wherein the retardation controlling agent is a compound represented by formula (IV):

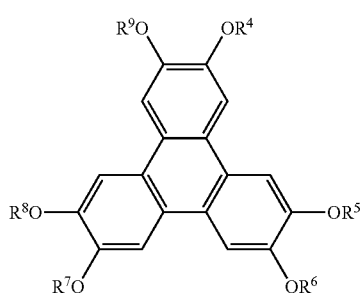

Formula (IV)

wherein $R^4$, $R^5$, $R^6$, $R^7$, $R^8$, and $R^9$ each independently represent a hydrogen atom or a substituent.

(9) The optical compensation sheet according to any one of Items (1) to (8), wherein the cellulose acetate film has a surface energy of 55 mN/m to 75 mN/m.

(10) A method of producing an optical compensation sheet according to any one of Items (1) to (9), comprising the steps of:
feeding a cellulose acylate film in the longitudinal direction of the film; and
stretching the cellulose acylate film in a direction perpendicular to the longitudinal direction,
wherein the cellulose acylate film has a residual solvent content of 2% by mass to 50% by mass when the stretching is started, and the film has a slow axis in a direction perpendicular to the longitudinal direction of the film.

(11) The optical compensation sheet according to any one of Items (1) to (9) or the method of producing an optical compensation sheet according to Item (10), wherein the cellulose acylate is a cellulose acetate having an acetylation degree of 59.0% to 61.5%.

(12) The optical compensation sheet according to any one of Items (1) to (11) or the method of producing an optical compensation sheet according to Item (10) or (11), wherein the cellulose acylate film is comprised of a cellulose acylate in which a hydroxyl group of the cellulose is partially substituted with an acetyl group or with an acyl group having 3 to 22 carbon atoms, and wherein a substitution degree A of the acetyl group in the cellulose acylate and a substitution degree B of the acyl group having 3 to 22 carbon atoms in the cellulose acylate satisfy expression (III).

$$2 \leq A+B \leq 3.0 \qquad \text{Expression (III)}$$

(13) The optical compensation sheet or the method of producing an optical compensation sheet according to Item (12), wherein the acyl group having 3 to 22 carbon atoms in the cellulose acylate is a butanoyl group or a propionyl group.

(14) A liquid crystal display device, comprising a liquid crystal cell, and two polarizing plates disposed on both sides of the liquid crystal cell, said polarizing plate comprising a polarizing film and two transparent protective films disposed on both sides of the polarizing film, wherein the optical compensation sheet according to any one of Items (1) to (13) is disposed between the liquid crystal cell and at least one polarizing film, and wherein a slow axis of the cellulose acylate film and a transmission axis of the polarizing film adjacent to the cellulose acylate film are arranged in substantially parallel to each other.

(15) The liquid crystal display device according to Item (14), wherein the liquid crystal display device has a VA mode.

Herein, the Re and the Rth indicate the in-plane retardation and the retardation in the direction of the thickness, respectively. The Re is measured by making light having a wavelength of 590 nm incident in the direction of the normal of the film in KOBRA 21ADH (trade name, manufactured by Oji Scientific Instruments). The Rth is a value calculated by KOBRA 21ADH based on (i) the retardation values measured in total three directions, these retardation values including the above Re, the retardation value measured by allowing light having a wavelength of λnm to be incident from a direction inclined at an angle of +40° with the direction of the normal of the film by adopting the slow axis (which is determined by the KOBRA 21ADH) within the surface as a slant axis (rotation axis), and the retardation value measured by allowing light having a wavelength of λnm to be incident from a direction inclined at an angle of −40° with the direction of the normal of the film by adopting the slow axis within the surface as a slant axis (rotation axis); (ii) an hypothetical value of the average refractive index; and (iii) a film thickness input. Herein, as the hypothetical value of the average refractive index, use may be made, for example, of values described in "Polymer Handbook" (JOHN WILEY & SONS, INC.) and values described in catalogues of various optical films. Unknown average refractive indexes may be determined by Abbe refractometer. Average refractive indexes of major optical films are exemplified in below: cellulose acylate (1.48), cycloolefin polymer (1.52), polycarbonate (1.59), polymethyl methacrylate (1.49), and polystyrene (1.59). KOBRA 21ADH calculates nx, ny and nz, by inputting these hypothetical values of the average refractive index and the film thickness. The calculated nx, ny and nz are utilized to further calculate $Nz=(nx-nz)/(nx-ny)$.

In the present invention, the term "compounds different in Re/Rth ratios each other" means compounds exhibiting values of Re/Rth ratios different in each other, in which said ratio is calculated from the measured Re and Rth values of a triacetyl cellulose that contains any one of the compounds and that is produced through dope preparation, casting, and stretching.

Herein, specifically, the value of Re/Rth ratio is calculated from Re and Rth measured with light of wavelength 590 nm in KOBRA 21ADH (trade name, manufactured by Oji Scientific Instruments), with respect to a film produced by a process of the steps of: casting a dope prepared as described below on a glass plate, drying the dope at 70° C. for 6 minutes, separating the dried dope from the glass plate, and then further drying it at 100° C. for 10 minutes and at 120° C. for 20 minutes, and stretching the dried product by 20% with a fixed-end stretching machine, to form the film thus cast and dried. Since these values vary with the content of the compound and the stretch ratio, the value obtained with respect to a film produced with an addition amount of 2% by mass and stretched by 20% is used as a control value.

| | |
|---|---|
| Triacetyl cellulose (acetylation degree: 60.9%) | 100 mass parts |
| Triphenyl phosphate (plasticizer) | 7.8 mass parts |
| Biphenyldiphenyl phosphate (plasticizer) | 3.9 mass parts |
| Methylene chloride | 318 mass parts |
| Methanol | 47 mass parts |
| Compound (retardation controlling agent) | 2 mass parts |

By the use of the optical compensation sheet of the present invention, liquid crystal cells can be optically compensated with the optical compensation sheet consisting only of one cellulose acylate film. According to the present invention, it is also possible to obtain optical compensation sheets having a combination of Re and Rth in a very wide range, which would otherwise not be reached by conventional techniques.

When the optical compensation sheet of the present invention is used as one of the protective films of the polarizing plate, it is possible to add an optical compensation function to the polarizing plate, without increasing the number of structural elements of the polarizing plate.

The aforementioned optical compensation sheet composed only of the cellulose acetate film, and the polarizing plate that uses the optical compensation sheet as a protective film, each can be advantageously used particularly in VA mode or OCB mode liquid crystal display devices.

BEST MODE FOR CARRYING OUT INVENTION

In the present invention, it is preferable that the Re retardation value of the cellulose acylate film be adjusted to 60 to 120 nm and the Rth retardation value be adjusted to 100 to 250 nm.

In the present invention, it is possible to control a variation of Re/Rth per 1% of the stretch ratio to 0.01 to 0.1. Herein, the variation in Re/Rth per 1% of the stretch ratio may be found from the gradient of the line obtained when each Re/Rth ratio vs. at least three stretch ratios of each 5% or more is primarily approximated.

The birefringence index (nx−ny) of the cellulose acylate film is preferably in the range of 0.0002 to 0.0009, more preferably in the range of 0.00025 to 0.0009, and most preferably in the range of 0.00035 to 0.0009.

The birefringence index {(nx+ny)/2−nz} of the cellulose acylate film in the thickness direction is preferably in the range of 0.0006 to 0.005, more preferably in the range of 0.0008 to 0.005, and most preferably in the range of 0.0012 to 0.005.

(Cellulose Acylate Film)

Any known cotton material may be used for the cellulose acylate for use in the present invention (for example, see Journal of Technical Disclosure No. 2001-1745, published by Japan Institute of Invention and Innovation). The cellulose acylate may also be synthesized by any known method (for example, see Uda et al., "Mokuzai Kagaku (Wood Chemistry)", published by KYORITSU SHUPPAN CO., LTD., 1968, pp. 180-190). The average polymerization degree in terms of viscosity of a cellulose acylate that can be used in the present invention is preferably from 200 to 700, more preferably from 250 to 500, and particularly preferably from 250 to 350. The cellulose ester for use in the present invention preferably has a narrow molecular mass distribution in terms of Mw/Mn (Mw is a mass average molecular mass and Mn is a number average molecular mass) as measured by gel permeation chromatography. Specifically, the value of Mw/Mn is preferably from 1.5 to 5.0, more preferably from 2.0 to 4.5, and most preferably from 2.0 to 4.0.

As the acyl group of the cellulose acylate film, there is no particular limitation to the acyl group, and an acetyl group, propionyl group or butyryl group is preferably used, and an acetyl group is particularly preferably used. The degree of substitution of all acyl groups is preferably 1.5 to 3.0, more preferably 2.7 to 3.0 and particularly preferably 2.8 to 2.95. Herein, the degree of substitution of an acyl group(s) is a value calculated according to ASTM D817.

It is most preferable that the acyl group be an acetyl group. When a cellulose acetate containing an acetyl group as the acyl group is used, the degree of acetylation is preferably 59.0 to 62.5%, more preferably 59.0 to 61.5%. When the degree of acetylation is within this range, the Re is not larger than a desired value by a conveyance tension at the time of casting, the in-plane dispersion of Re is decreased, and a variation in retardation value due to change in temperature and humidity is not increased.

The degree of substitution of an acyl group at the sixth position is preferably 0.9 or more, from the viewpoint of suppressing the dispersions of Re and Rth.

(Retardation Controlling Agent)

In the present invention, the cellulose acylate film contains at least two compounds that have different properties with respect to development of optical anisotropy (Re/Rth ratio) upon stretching. With respect to the two compounds to be used exhibiting different Re/Rth ratios, the difference between the Re/Rth ratios is preferably 0.05 or more, more preferably 0.10 or more. Preferably, at least two compounds are utilized in combination, one compound of which exhibits a Re/Rth ratio of less than 0.35 when a cellulose triacetate film containing said compound is stretched, and another of which exhibits a Re/Rth ratio of not less than 0.35 when a cellulose triacetate film containing said compound is stretched.

Preferable examples of the compound exhibiting a Re/Rth ratio of less than 0.35, include those represented by formula (I) or (II).

The compound represented by formula (I) is described below.

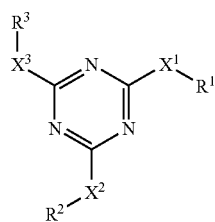

Formula (I)

In formula (I), $X^1$ represents a single bond, —$NR^4$—, —O—, or —S—; $X^2$ represents a single bond, —$NR^5$—, —O—, or —S—; $X^3$ represents a single bond, —$NR^6$—, —O—, or —S—; $R^1$, $R^2$ and $R^3$ each independently represent an alkyl group, an alkenyl group, an aryl group, or a heterocyclic group; and $R^4$, $R^5$ and $R^6$ each independently represent a hydrogen atom, an alkyl group, an alkenyl group, an aryl group, or a heterocyclic group.

The compound represented by formula (I) has a 1,3,5-triazine ring, and may be preferably an aromatic compound having at least two aromatic rings.

In particular, the compound represented by formula (I) is preferably a melamine compound. In the melamine compound represented by formula (I), $X^1$, $X^2$ and $X^3$ are —$NR^4$—, —$NR^5$— and —$NR^6$—, respectively, or alternatively $X^1$, $X^2$ and $X^3$ are each a single bond, and $R^1$, $R^2$ and $R^3$ are each a heterocyclic group having a free atomic valence on a nitrogen atom. The groups —$X^1$—$R^1$, —$X^2$—$R^2$ and —$X^3$—$R^3$ are preferably the same. In particular, $R^1$, $R^2$ and $R^3$ each preferably are an aryl group. In particular, $R^4$, $R^5$ and $R^6$ each preferably are a hydrogen atom.

For the alkyl group, a chain alkyl group is preferable to a cyclic alkyl group, and a linear chain alkyl group is preferable to a branched chain alkyl group.

The number of carbon atoms in the alkyl group is preferably from 1 to 30, more preferably from 1 to 20, still more preferably from 1 to 10, even more preferably from 1 to 8, most preferably from 1 to 6. The alkyl group may have a substituent or substituents. Examples of the substituent include a halogen atom, an alkoxy group (e.g. methoxy, ethoxy and epoxyethyloxy), and an acyloxy group (e.g. acryloyloxy and methacryloyloxy). For the alkenyl group, a chain alkenyl group is preferable to a cyclic alkenyl group, and a linear chain alkenyl group is preferable to a branched chain alkenyl group. The number of carbon atoms in the alkenyl group is preferably from 2 to 30, more preferably from 2 to 20, still more preferably from 2 to 10, even more preferably from 2 to 8, most preferably from 2 to 6. The alkenyl group may have a substituent or substituents. Examples of the substituent include a halogen atom, an alkoxy group (e.g. methoxy, ethoxy and epoxyethyloxy), and an acyloxy group (e.g. acryloyloxy and methacryloyloxy).

The aryl group is preferably phenyl or naphthyl, particularly preferably phenyl. The aryl group may have a substituent or substituents. Examples of the substituent include a halogen atom, hydroxyl, cyano, nitro, carboxyl, and groups of alkyl, alkenyl, aryl, alkoxy, alkenyloxy, aryloxy, acyloxy, alkoxycarbonyl, alkenyloxycarbonyl, aryloxycarbonyl, sulfamoyl, alkyl-substituted sulfamoyl, alkenyl-substituted sulfamoyl, aryl-substituted sulfamoyl, sulfonamido, carbamoyl, alkyl-substituted carbamoyl, alkenyl-substituted carbamoyl, aryl-substituted carbamoyl, amido, alkylthio, alkenylthio, arylthio, and acyl. The alkyl group has the same meaning as defined above. The alkyl moiety of the alkoxy, acyloxy, alkoxycarbonyl, alkyl-substituted sulfamoyl, sulfonamido, alkyl-substituted carbamoyl, amido, alkylthio, and acyl groups may be the same as the above alkyl group.

The alkenyl group has the same meaning as defined above. The alkenyl moiety of the alkenyloxy, acyloxy, alkenyloxycarbonyl, alkenyl-substituted sulfamoyl, sulfonamido, alkenyl-substituted carbamoyl, amido, alkenylthio, and acyl groups may be the same as the above alkenyl group. Examples of the aryl group include phenyl, α-naphthyl, β-naphthyl, 4-methoxyphenyl, 3,4-diethoxyphenyl, 4-octyloxyphenyl, and 4-dodecyloxyphenyl. Examples of the aryl moiety of the aryloxy, acyloxy, aryloxycarbonyl, aryl-substituted sulfamoyl, sulfonamido, aryl-substituted carbamoyl, amido, arylthio, and acyl groups may be the same as those of the above aryl group.

When $X^1$, $X^2$ or $X^3$ is —$NR^4$—, —$NR^5$—, or —$NR^6$—, the heterocyclic group represented by $R^4$, $R^5$ and $R^6$ is preferably aromatic. The aromatic heterocycle is generally an unsaturated heterocycle, preferably a heterocycle having double bonds in the largest number. The heterocycle is preferably a five-, six- or seven-membered ring, more preferably a five- or six-membered ring, most preferably a six-membered ring. The hetero atom of the heterocycle is preferably N, S or O, particularly preferably N. The aromatic heterocycle is particularly preferably a pyridine ring (in which the heterocyclic group is preferably 2-pyridyl or 4-pyridyl). The heterocycle may have a substituent or substituents. Examples of the substituent of the heterocyclic group may be the same as those of the substituent on the aryl moiety. When $X^1$, $X^2$ or $X^3$ is a single bond, the heterocyclic group preferably has a free atomic valence on a nitrogen atom. The heterocyclic group having a free atomic valence on a nitrogen atom is preferably a five-, six- or seven-membered ring, more preferably a five- or six-membered ring, most preferably a five-membered ring. The heterocyclic group may have two or more nitrogen atoms. The heterocyclic group may also have a hetero atom (e.g. O or S) other than the nitrogen atom. The heterocyclic group may have a substituent or substituents. Examples of the substituent of the heterocyclic group may be the same as those of the substituent on the aryl moiety.

Preferred examples of the compound represented by formula (I) are shown below, but the invention is not meant to be limited to these.

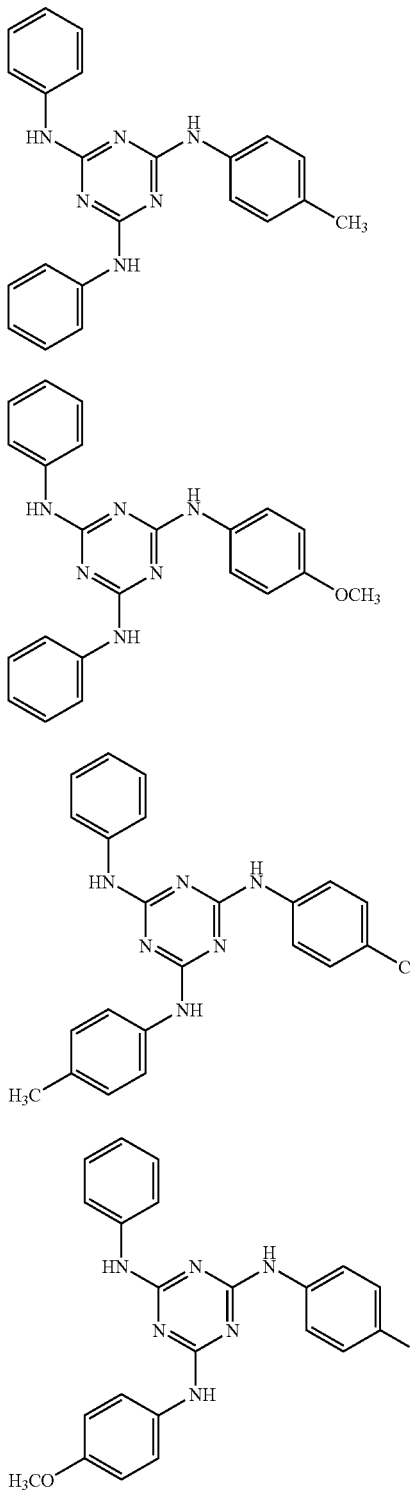

The compound represented by formula (I) can be synthesized according to the synthetic method as described, for example, in JP-A-2003-344655.

Next, the compound represented by formula (II) is described below.

$$Ar^1\text{-}L^1\text{-}(Ar^2\text{-}L^2)_n\text{-}Ar^3 \qquad \text{Formula (II)}$$

In formula (II), $Ar^1$, $Ar^2$ and $Ar^3$ each independently represent an aryl group or an aromatic heterocyclic group; $L^1$ and $L^2$ each independently represent a single bond or a divalent linking group; n represents an integer of 3 or more; and a plurality of the $Ar^2$ moieties may be the same or different, and a plurality of the $L^2$ moieties may be the same or different.

$Ar^1$, $Ar^2$ or $Ar^3$ represents an aryl group or an aromatic heterocycle. The aryl group represented by $Ar^1$, $Ar^2$ or $Ar^3$ is preferably an aryl group of 6 to 30 carbon atoms, and may be a monocycle or condensed with any other ring(s) to form a condensed ring. If possible, the aryl group may have a substituent or substituents, which may be the substituent T as described later.

In formula (II), the aryl group represented by $Ar^1$, $Ar^2$ or $Ar^3$ is more preferably of 6 to 20 carbon atoms, particularly preferably of 6 to 12 carbon atoms, examples of which include phenyl, p-methylphenyl and naphthyl.

In formula (II), the aromatic heterocycle represented by $Ar^1$, $Ar^2$ or $Ar^3$ may be any aromatic heterocycle having at least one of oxygen, nitrogen and sulfur atoms, and is preferably a five- or six-membered aromatic heterocycle having at least one of oxygen, nitrogen and sulfur atoms. If possible, the aromatic heterocycle may have a substituent or substituents, which may be the substituent T as described later.

The aforementioned substituent T is explained below.

Examples of the substituent T include an alkyl group (preferably an alkyl group having from 1 to 20, more preferably from 1 to 12, and particularly preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably an alkenyl group having from 2 to 20, more preferably from 2 to 12, and particularly preferably from 2 to 8 carbon atoms, e.g., vinyl, allyl, 2-butenyl, 3-pentenyl), an alkynyl group (preferably an alkynyl group having from 2 to 20, more preferably from 2 to 12, and particularly preferably from 2 to 8 carbon atoms, e.g., propargyl, 3-pentynyl), an aryl group (preferably an aryl group having from 6 to 30, more preferably from 6 to 20, and particularly preferably from 6 to 12 carbon atoms, e.g., phenyl, p-methylphenyl, naphthyl), a substituted or unsubstituted amino group (preferably an amino group having from 0 to 20, more preferably from 0 to 10, and particularly preferably from 0 to 6 carbon atoms, e.g., amino, methylamino, dimethylamino, diethylamino, dibenzylamino), an alkoxy group (preferably an alkoxy group having from 1 to 20, more preferably from 1 to 12, and particularly preferably from 1 to 8 carbon atoms, e.g., methoxy, ethoxy, butoxy), an aryloxy group (preferably an aryloxy group having from 6 to 20, more preferably from 6 to 16, and particularly preferably from 6 to 12 carbon atoms, e.g., phenyloxy, 2-naphthyloxy), an acyl group (preferably an acyl group having from 1 to 20, more preferably from 1 to 16, and particularly preferably from 1 to 12 carbon atoms, e.g., acetyl, benzoyl, formyl, pivaloyl), an alkoxycarbonyl group (preferably an alkoxycarbonyl group having from 2 to 20, more preferably from 2 to 16, and particularly preferably from 2 to 12 carbon atoms, e.g., methoxycarbonyl, ethoxycarbonyl), an aryloxycarbonyl group (preferably an aryloxycarbonyl group having from 7 to 20, more preferably from 7 to 16, and particularly preferably from 7 to 10 carbon atoms, e.g., phenyloxycarbonyl), an acyloxy group (preferably an acyloxy group having from 2 to 20, more preferably from 2 to 16, and particularly preferably from 2 to 10 carbon atoms, e.g., acetoxy, benzoyloxy), an acylamino group (preferably an acylamino group having from 2 to 20, more preferably from 2 to 16, and particularly preferably from 2 to 10 carbon atoms, e.g., acetylamino, benzoylamino), an alkoxycarbonylamino group (preferably an alkoxycarbonylamino group having from 2 to 20, more preferably from 2 to 16, and particularly preferably from 2 to 12 carbon atoms, e.g., methoxycarbonylamino), an aryloxycarbonylamino group (preferably an aryloxycarbonylamino group having from 7 to 20, more preferably from 7 to 16, and particularly preferably from 7 to 12 carbon atoms, e.g., phenyloxycarbonylamino), a sulfonylamino group (preferably a sulfonylamino group having from 1 to 20, more preferably from 1 to 16, and particularly preferably from 1 to 12 carbon atoms, e.g., methanesulfonylamino, benzenesulfonylamino), a sulfamoyl group (preferably a sulfamoyl group having from 0 to 20, more preferably from 0 to 16, and particularly preferably from 0 to 12 carbon atoms, e.g., sulfamoyl, methylsulfamoyl, dimethylsulfamoyl, phenylsulfamoyl), a carbamoyl group (preferably a carbamoyl group having from 1 to 20, more preferably from 1 to 16, and particularly preferably from 1 to 12 carbon atoms, e.g., carbamoyl, methylcarbamoyl, diethylcarbamoyl, phenylcarbamoyl), an alkylthio group (preferably an alkylthio group having from 1 to 20, more preferably from 1 to 16, and particularly preferably from 1 to 12 carbon atoms, e.g., methylthio, ethylthio), an arylthio group (preferably an arylthio group having from 6 to 20, more preferably from 6 to 16, and particularly preferably from 6 to 12 carbon atoms, e.g., phenylthio), a sulfonyl group (preferably a sulfonyl group having from 1 to 20, more preferably from 1 to 16, and particularly preferably from 1 to 12 carbon atoms, e.g., mesyl, tosyl), a sulfinyl group (preferably a sulfinyl group having from 1 to 20, more preferably from 1 to 16, and particularly preferably from 1 to 12 carbon atoms, e.g., methanesulfinyl, benzenesulfinyl), a ureido group (preferably a ureido group having from 1 to 20, more preferably from 1 to 16, and particularly preferably from 1 to 12 carbon atoms, e.g., ureido, methylureido, phenylureido), a phosphoric acid amido group (preferably a phosphoric acid amido group having from 1 to 20, more preferably from 1 to 16, and particularly preferably from 1 to 12 carbon atoms, e.g., diethylphosphoric acid amido, phenylphosphoric acid amido), a hydroxy group, a mercapto group, a halogen atom (e.g., fluorine, chlorine, bromine, or iodine atom), a cyano group, a sulfo group, a carboxyl group, a nitro group, a hydroxamic acid group, a sulfino group, a hydrazino group, an imino group, a heterocyclic group (preferably a heterocyclic group having from 1 to 30, and more preferably from 1 to 12 carbon atoms; containing, as a hetero atom(s), for example, a nitrogen atom, an oxygen atom, or a sulfur atom, and specifically, e.g., imidazolyl, pyridyl, quinolyl, furyl, piperidyl, morpholino, benzoxazolyl, benzimidazolyl, benzothiazolyl can be exemplified), and a silyl group (preferably a silyl group having 3 to 40, more preferably 3 to 30, and particularly preferably 3 to 24 carbon atoms, e.g. trimethylsilyl, triphenylsilyl). These substituents may further be substituted.

When there are two or more substituents, they may be the same or different. The substituents may bond together, to form a ring, if possible.

Specific examples of the aromatic heterocycle represented by $Ar^1$, $Ar^2$ or $Ar^3$ in formula (II) include furan, pyrrole, thiophene, imidazole, pyrazole, pyridine, pyradine, pyridazine, triazole, triazine, indole, indazole, purin, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene, pyrrolotriazole, and pyrazolotriazole. The aromatic heterocycle is preferably benzimidazole, benzoxazole, benzothiazole, or benzotriazole.

In formula (II), $L^1$ or $L^2$ represents a single bond or a divalent linking group. Preferred examples of the divalent linking group include a group represented by —$NR^7$—, in which $R^7$ represents a hydrogen atom or optionally substituted alkyl or aryl group; —$SO_2$—, —CO—, an alkylene group, a substituted alkylene group, an alkenylene group, a substituted alkenylene group, an alkynylene group, —O—, —S—, —SO—, and a group formed of a combination of two or more of these divalent groups. Among these divalent groups, —O—, —CO—, —$SO_2NR^7$—, —$NR^7SO_2$—, —$CONR^7$—, —$NR^7CO$—, —COO—, —COO—, and an alkynylene group are more preferred, and —$CONR^7$—, —$NR^7CO$—, —COO—, —COO—, and an alkynylene group are most preferred.

In the compound represented by formula (II) that can be used in the present invention, $Ar^2$ is linked to $L^1$ and $L^2$, and when $Ar^2$ is a phenylene group, $L^1$-$Ar^2$-$L^2$ and $L^2$-$Ar^2$-$L^2$ each most preferably form a para position relationship (1,4-position relationship).

In formula (II), n represents an integer of 3 or more, preferably of 3 to 7, more preferably of 3 to 5.

Specific examples of the compound represented by formula (II) are shown below, but the invention is not meant to be limited to these.

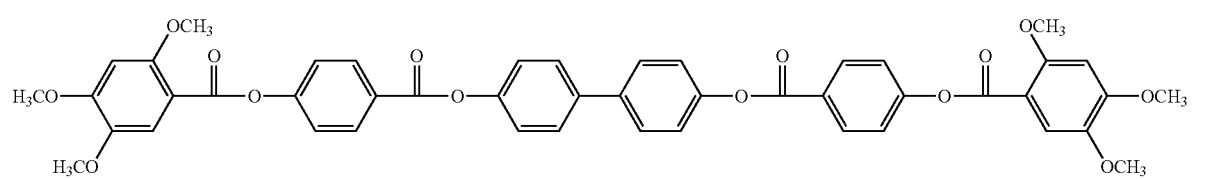

(II-1)

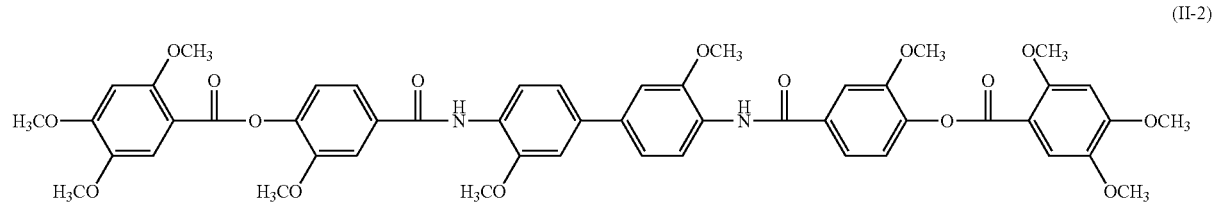

(II-2)

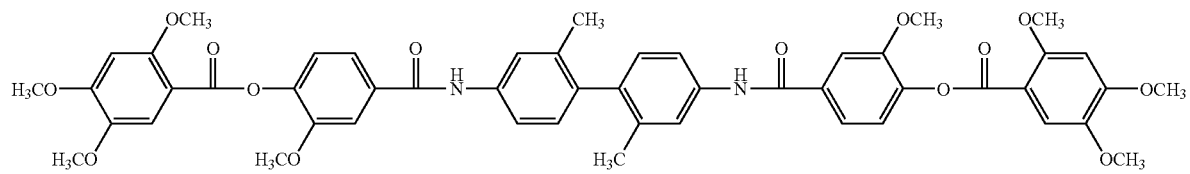
(II-3)
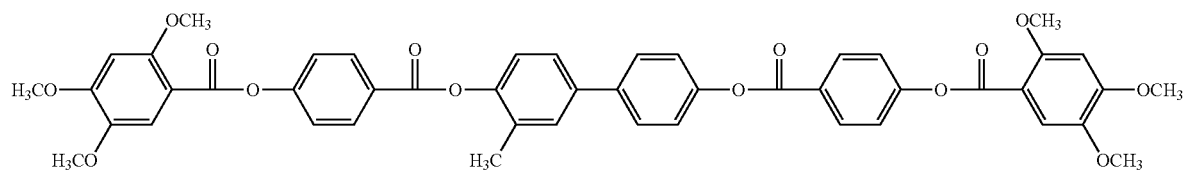
(II-4)
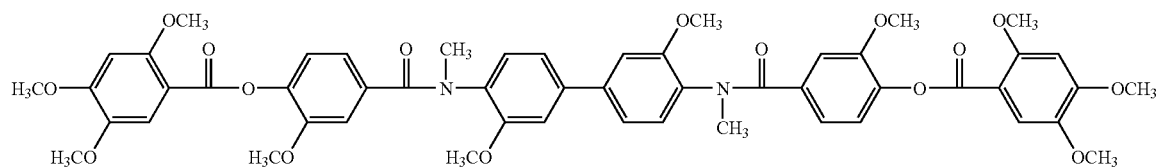
(II-5)
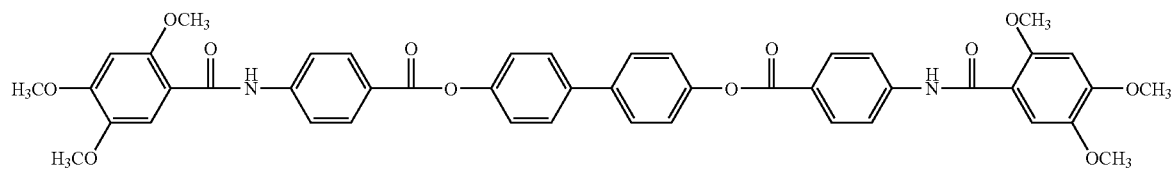
(II-6)
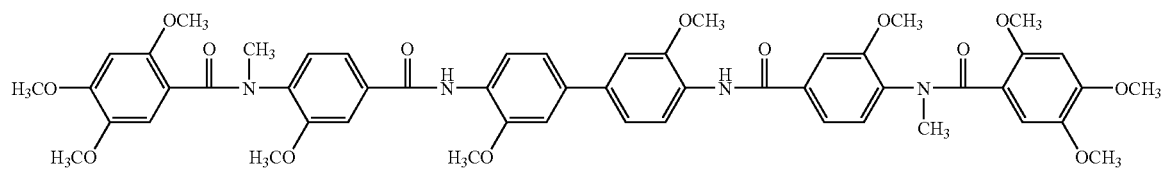
(II-7)
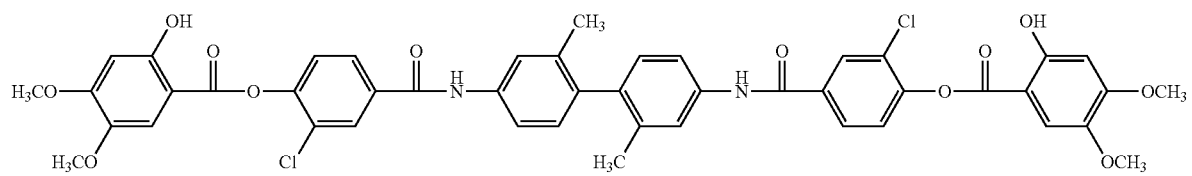
(II-8)
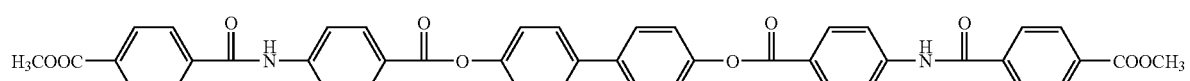
(II-9)
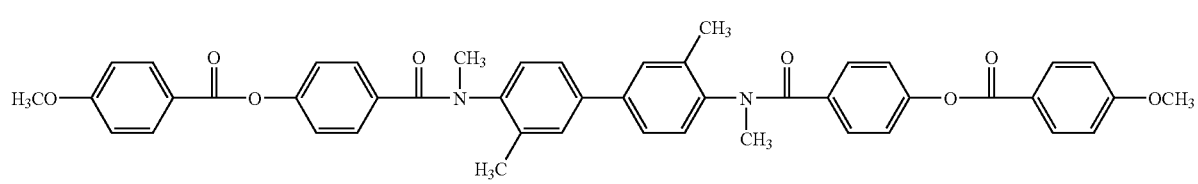
(II-10)

-continued
(II-11)
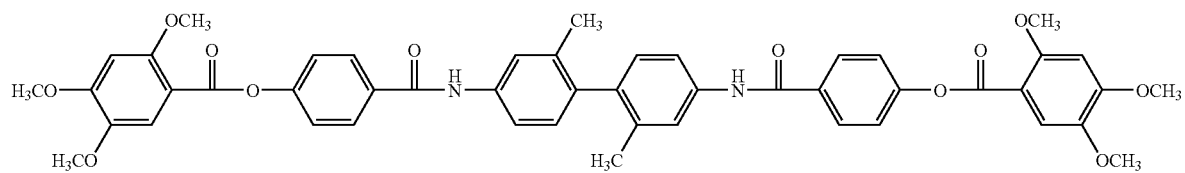
(II-12)
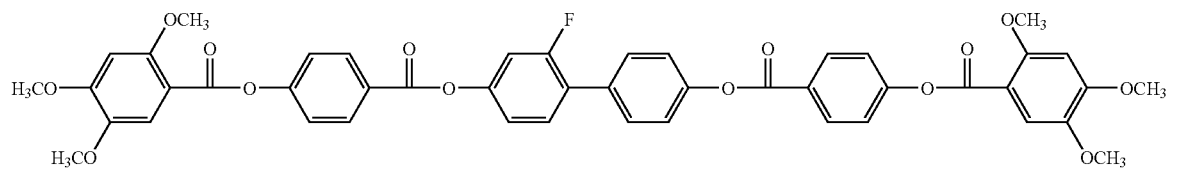
(II-13)
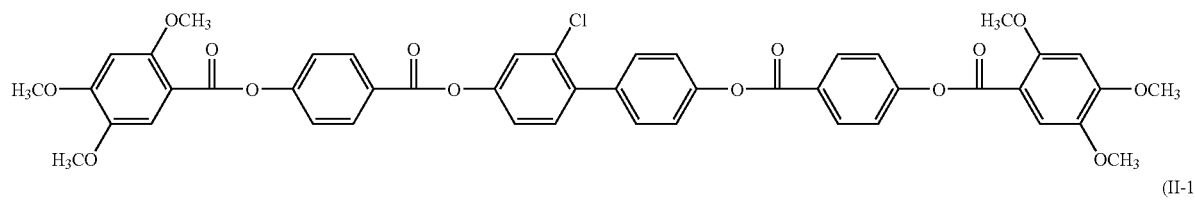
(II-14)
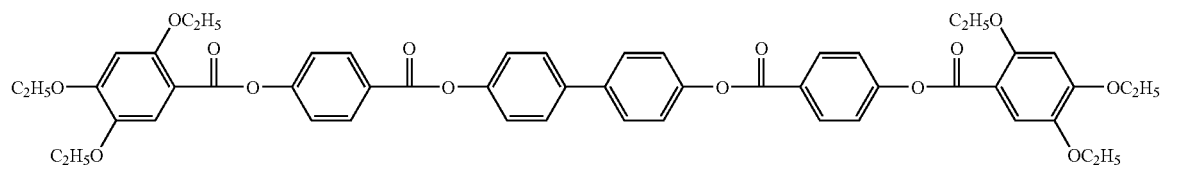
(II-15)
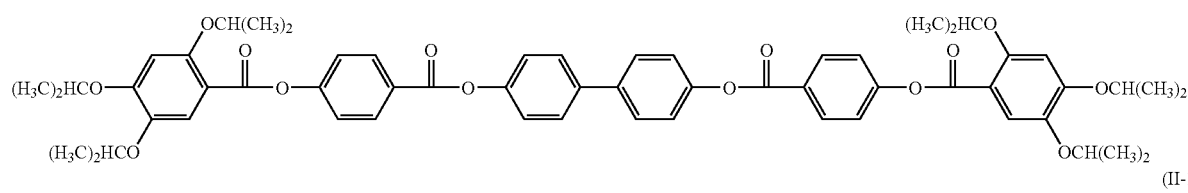
(II-16)
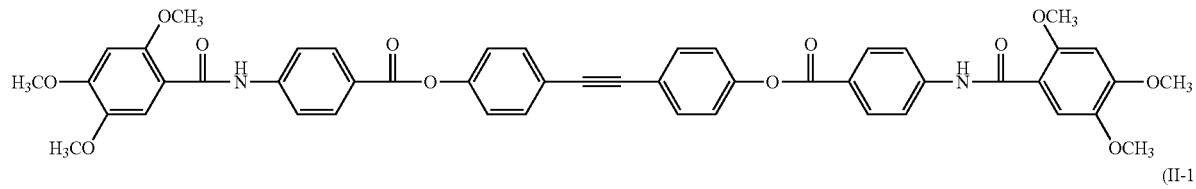
(II-17)
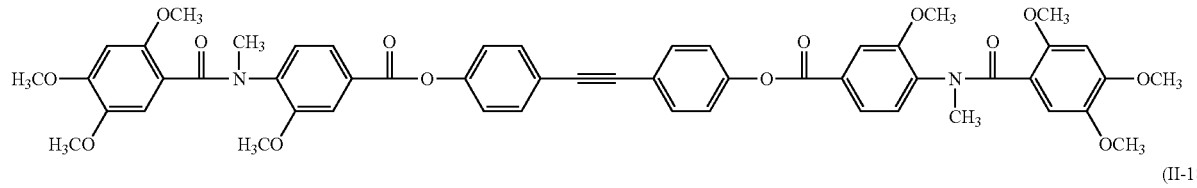
(II-18)
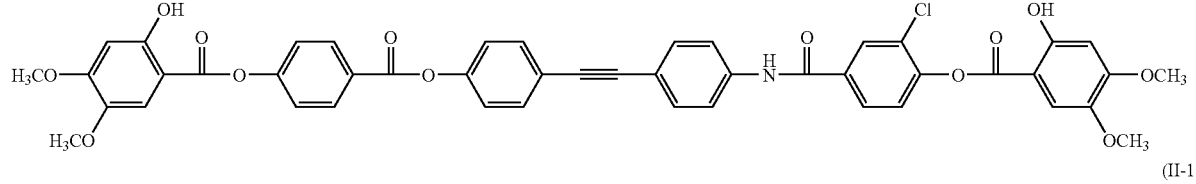
(II-19)
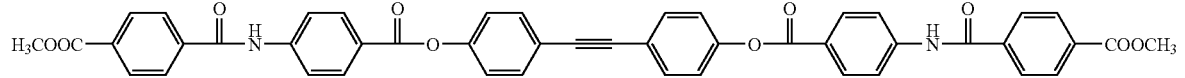

-continued
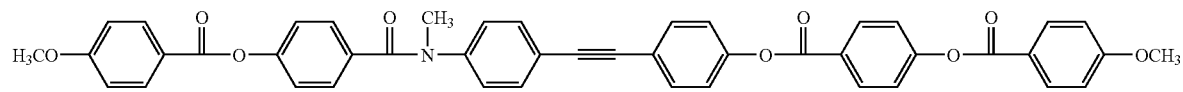
(II-20)
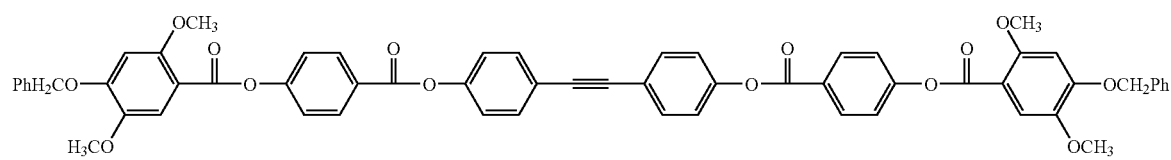
(II-21)
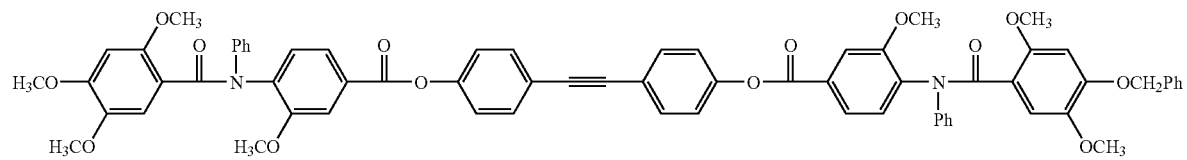
(II-22)
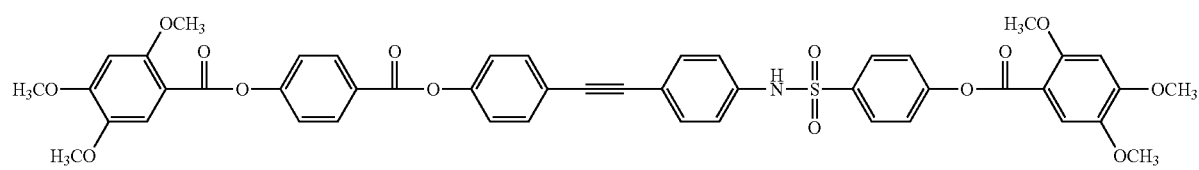
(II-23)
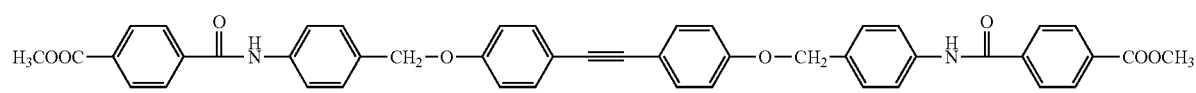
(II-24)
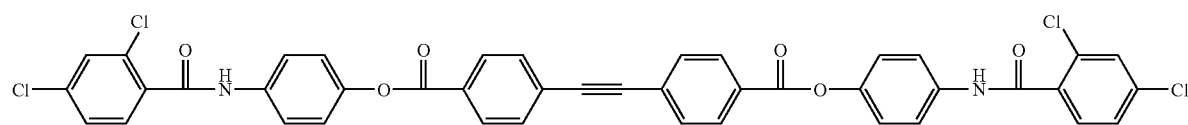
(II-25)
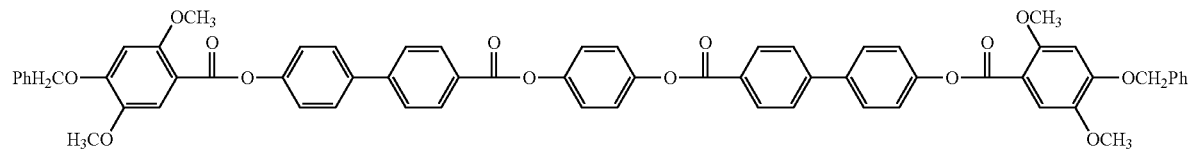
(II-26)
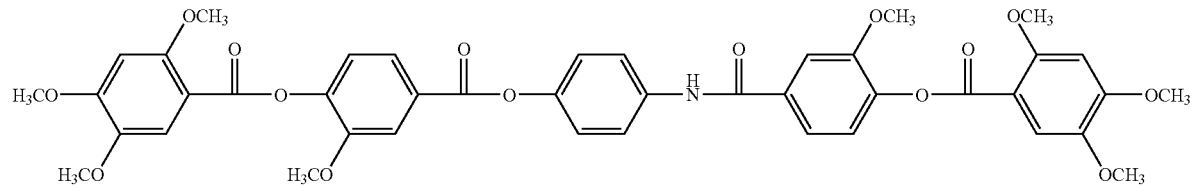
(II-27)
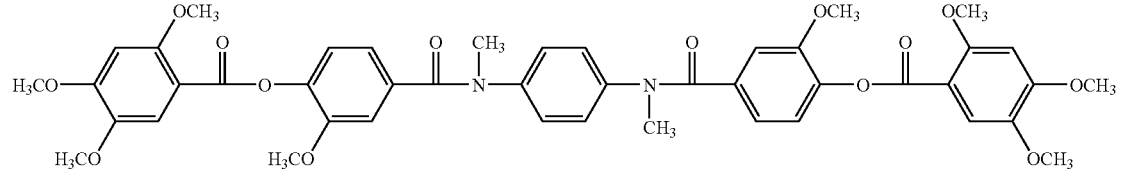
(II-28)

-continued
(II-29)
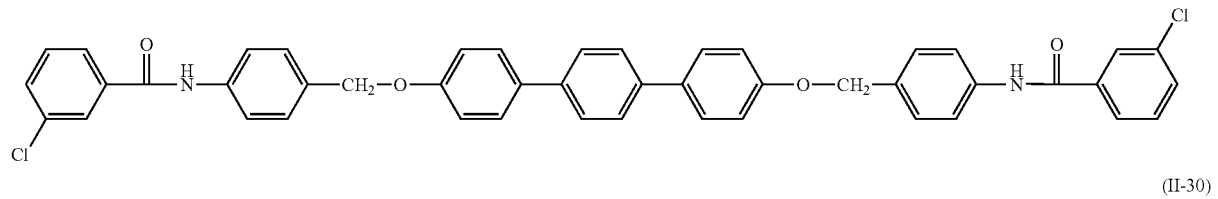
(II-30)
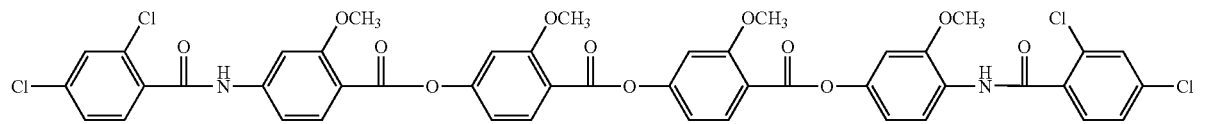
(II-31)
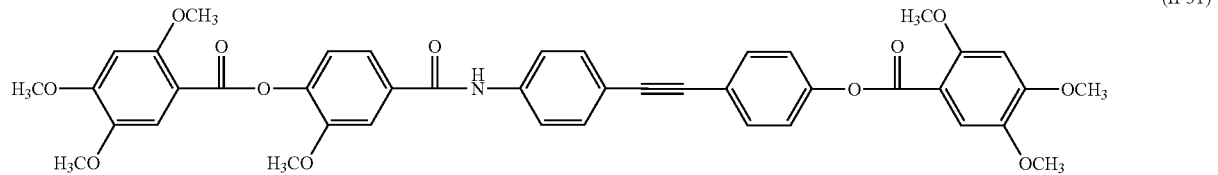
(II-32)
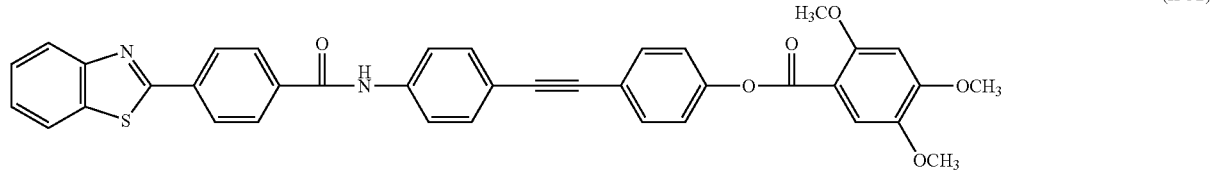
(II-33)
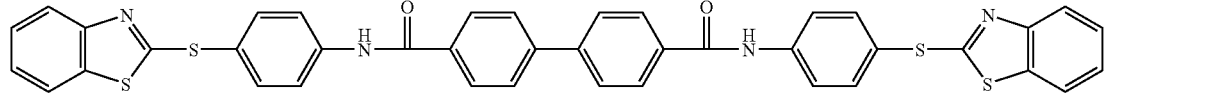
(II-34)
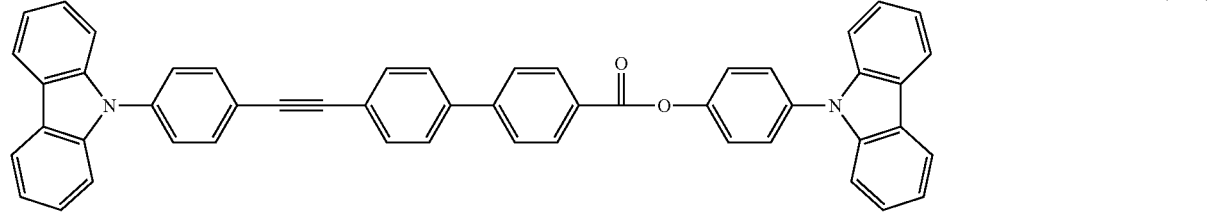
(II-35)
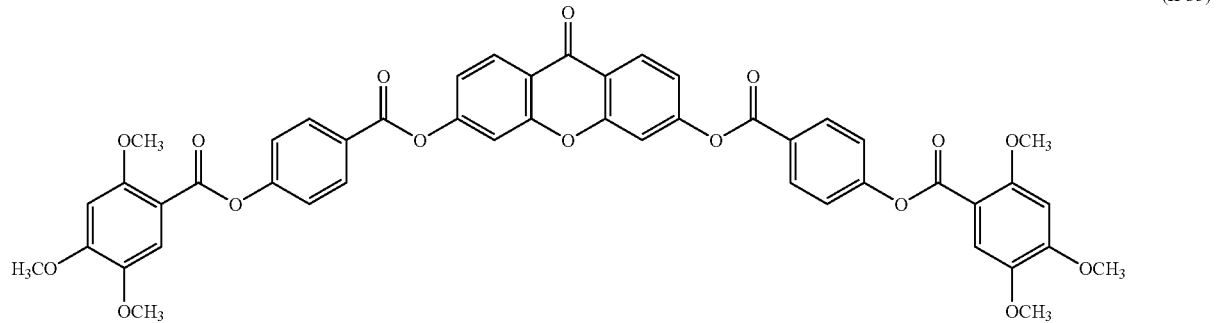
(II-36)
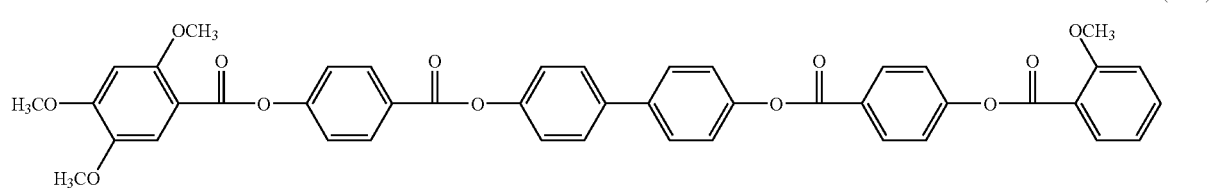

-continued

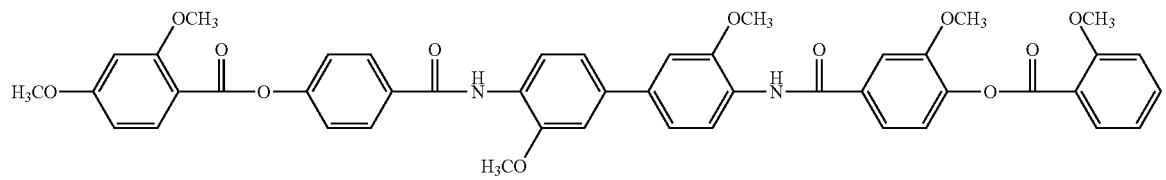
(II-37)

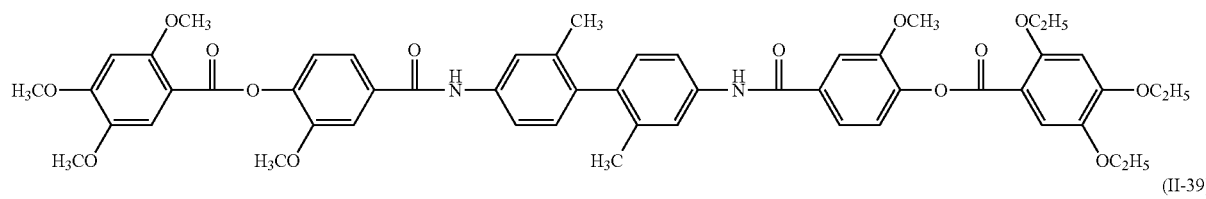
(II-38)

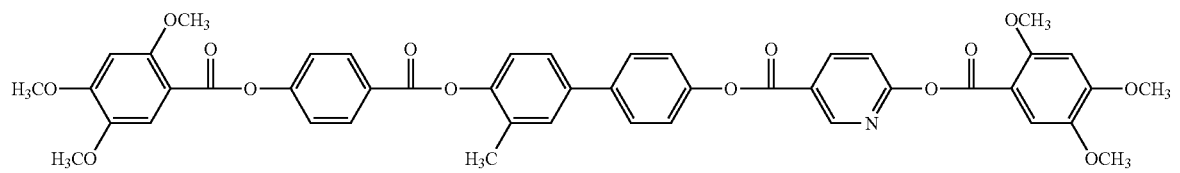
(II-39)

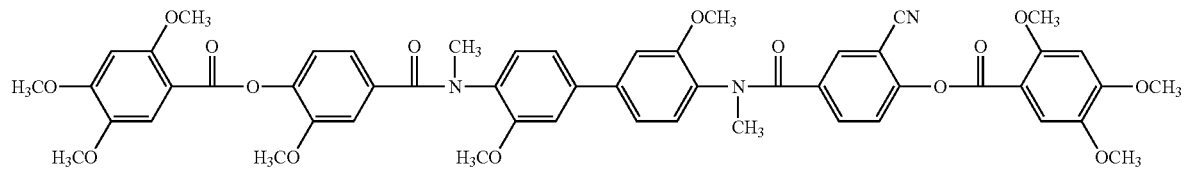
(II-40)

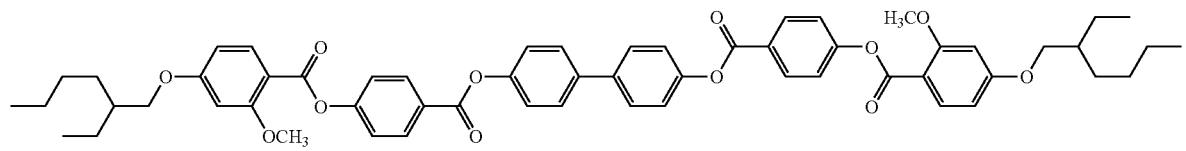
(II-41)

The compound represented by formula (II) can be synthesized by any of known methods. In the following, one of such methods will be explained taking Exemplified compound (II-41) as an example, but the invention is not limited to this.

Synthetic Example 1

Synthesis of Exemplified Compound (II-41)

The exemplified compound (II-41) was synthesized in accordance with the following scheme:

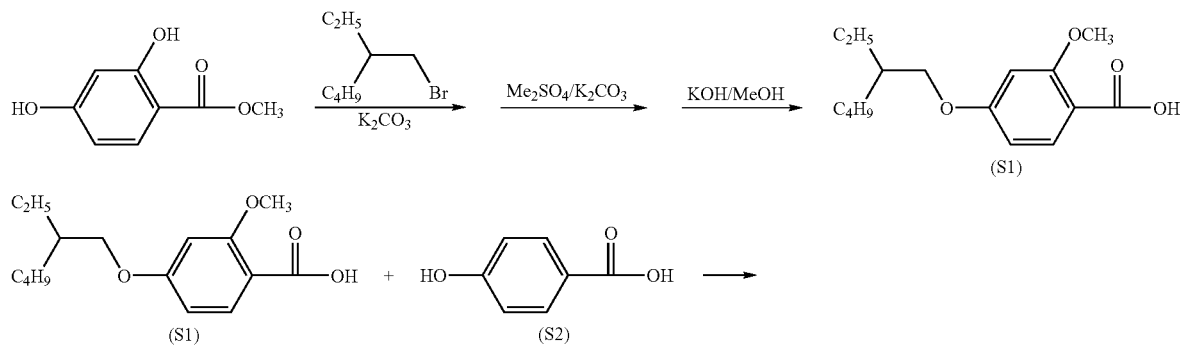

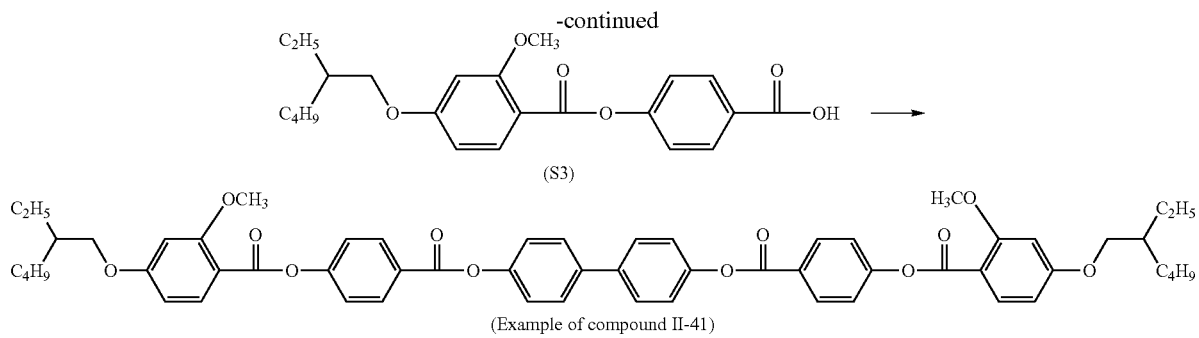

(Example of compound II-41)

(Synthesis of Intermediate (S1))

To 500 ml of DMF, 67.3 g of methyl 2,4-dihydroxybenzoate, 85.3 ml of 2-ethylhexylbromide, and 137.5 g of potassium carbonate were added, and the resultant mixture was heated under stirring on a hot water bath for 6 hours. Then, 75.9 ml of dimethyl sulfate and 137 g of potassium carbonate were added thereto, followed by heating under stirring further for 10 hours. After the completion of the reaction, 500 ml of ethyl acetate was added thereto, to separate inorganic salts by vacuum filtration. The filtrate was admixed with water, and then the resultant organic layer was extracted twice with ethyl acetate. The organic layer was washed with 1N hydrochloric acid, water, and saturated brine subsequently, then dried over magnesium carbonate. The solvent was then distilled off under reduced pressure. The residue was purified by silica gel column chromatography (eluent: ethyl acetate/n-hexane=1/10), to give 70 g of a methyl ester-form intermediate as an oily substance (yield 59%). The thus-obtained methyl ester-form intermediate was dissolved in 150 ml of methanol and 143 ml of 5N potassium hydroxide aqueous solution, followed by heating under reflux for 2 hours. Then, the resultant mixture was poured into a mixed solution of 500 ml of water and 59.3 ml of 12N hydrochloric acid. Thereto, was added 500 ml of ethyl acetate, and the organic layer was extracted. The thus-obtained organic layer was subsequently washed with water and saturated brine, and dried over magnesium sulfate. The solvent was then distilled off under reduced pressure, to give 66 g of Intermediate (S1) as an oily substance.

(Synthesis of Intermediate (S3))

28 g of Intermediate (S1), 100 mL of toluene, and 0.1 mL of dimethylformamide were heated to 70° C. Then, to the resultant mixture, 8.03 ml of thionyl chloride was slowly added dropwise, followed by heating under stirring at 70° C. for 1 hour. Then, to the resultant reaction liquid, was added a solution prepared in advance by dissolving 13.81 g of 4-hydroxybenzoic acid (S2) in 20 mL of dimethylformamide. Then, the mixture was allowed to react at 70° C. for 2 hours. After the reaction, the reaction liquid was cooled to the room temperature, and ethyl acetate and water were added thereto, to extract an organic layer. The organic layer was washed with 1N hydrochloric acid, water, and saturated brine subsequently, then dried over magnesium sulfate. The solvent was then distilled off under reduced pressure. The residue was purified by silica gel column chromatography (eluent: methylene chloride/methanol=20/1), followed by dispersing with n-hexane, and then filtration under reduced pressure, to give 21.8 g of Intermediate (S3) as a white solid substance.

(Synthesis of Exemplified Compound (II-41))

19.22 g of Intermediate (S3), 3.72 g of 4,4'-biphenol, and 0.98 g of dimethylaminopyridine were dissolved in 75 ml of methylene chloride and 25 ml of THF. Thereto, 10.73 g of dicyclohexyl carbodiimide was slowly added, and then, the resultant solution was heated under reflux for 3 hours. Then, the reaction solution was cooled to room temperature, and the thus-precipitated crystals (dicyclohexylurea) were separated by filtration. The filtrate was admixed with water, and the organic layer was separated. The organic layer was washed with 1N hydrochloric acid, water, and saturated brine subsequently, then dried over magnesium sulfate. The solvent was then distilled off under reduced pressure. The residue was purified by silica gel column chromatography, and then recrystallized from methylene chloride/methanol, to give 6.4 g of Exemplified compound (II-41) as a white solid substance.

The thus-obtained compound was identified by $^1$H-NMR (400 MHz).

$^1$H-NMR (CDCl$_3$): δ 0.89 (m, 12H), 1.28-1.60 (m, 16H), 1.76 (m, 2H), 3.92 (m, 10H), 6.55 (m, 4H), 7.29 (d, 4H), 7.38 (d, 4H), 7.64 (d, 4H), 8.08 (d, 2H), 8.29 (d, 4H)

The melting point of the obtained compound was 94° C.

Preferable examples of the compound exhibiting a Re/Rth ratio of 0.35 or more, include those represented by formula (III).

$$Ar^{11}\text{-}L^{12}\text{-}X\text{-}L^{13}\text{-}Ar^{12} \qquad \text{Formula (III)}$$

In formula (III), $Ar^{11}$ and $Ar^{12}$ each independently represent an aromatic group; $L^{12}$ and $L^{13}$ each independently represent a divalent linking group selected from the group consisting of alkylene groups, —O—, —CO—, and combinations thereof; and X represents 1,4-cyclohexylene, vinylene, or ethynylene.

In formula (III), $L^{12}$ and $L^{13}$ each independently represent a divalent linking group selected from the group consisting of an alkylene group, —O—, —CO—, and a combination thereof. An alkylene group having a chain-like structure is preferred to a cyclic one. A linear alkylene group is further preferred to a branched chain-like one. The alkylene group preferably has from 1 to 10, more preferably from 1 to 8, further preferably from 1 to 6, still further preferably from 1 to 4, and most preferably from 1 or 2 (methylene or ethylene) carbon atoms. It is particularly preferable that $L^{12}$ and $L^{13}$ are —O—CO— or —CO—O—.

In formula (III), X represents 1,4-cyclohexylene, vinylene or ethynylene. X is preferably 1,4-cyclohexylene.

$Ar^{11}$ and $Ar^{12}$ each independently represent an aromatic group. The term "aromatic group" as referred to herein includes aryl groups (aromatic hydrocarbon groups), substituted aryl groups, aromatic heterocyclic groups, and substituted aromatic heterocyclic groups. An aryl group and a substituted aryl group are preferred to an aromatic heterocyclic group and a substituted aromatic heterocyclic group. An aromatic heterocyclic group generally has an unsaturated heterocycle. It is preferable that the aromatic heterocycle is 5-, 6- or 7-membered ring and a 5- or 6-membered ring is more preferable. In general, an aromatic heterocycle has double bonds in the largest number. As a hetero atom, nitrogen, oxygen and sulfur atoms are preferable and a nitrogen atom or sulfur atom is particularly preferable. Examples of the aromatic heterocycle include furan ring, thiophene ring, pyrrole ring, oxazole ring, isoxazole ring, thiazole ring, isothiazole ring, imidazole ring, pyrazole ring, furazane ring, triazole ring, pyran ring, pyridine ring, pyridazine ring, pyrimidine ring, pyrazine ring, and 1,3,5-triazine ring. Preferred aromatic rings of the aromatic groups are benzene ring, furan ring, thiophene ring, pyrrole ring, oxazole ring, thiazole ring, imidazole ring, triazole ring, pyridine ring, pyrimidine ring, and pyrazine ring, and benzene ring is particularly preferred.

Examples of the substituent in the substituted aryl group and substituted aromatic heterocyclic group include halogen atoms (F, Cl, Br and I), hydroxyl group, carboxyl group, cyano group, amino group, alkylamino groups (for example, methylamino, ethylamino, butylamino and dimethylamino groups), nitro group, sulfo group, carbamoyl group, alkylcarbamoyl groups (for example, N-methylcarbamoyl, N-ethylcarbamoyl and N,N-dimethylcarbamoyl groups), sulfamoyl group, alkylsulfamoyl groups (for example, N-methylsulfamoyl, N-ethylsulfamoyl and N, N-dimethylsulfamoyl groups), ureido group, alkylureido groups (for example, N-methylureido, N,N-dimethylureido and N,N,N'-trimethylureido groups), alkyl groups (for example, methyl, ethyl, propyl, butyl, pentyl, heptyl, octyl, isopropyl, s-butyl, t-amyl, cyclohexyl and cyclopentyl groups), alkenyl groups (for example, vinyl, allyl and hexenyl groups), alkynyl groups (for example, ethynyl and butynyl groups), acyl groups (for example, formyl, acetyl, butyryl, hexanoyl and lauryl groups), acyloxy groups (for example, acetoxy, butyryloxy, hexanoyloxy and lauryloxy groups), alkoxy groups (for example, methoxy, ethoxy, propoxy, butoxy, pentyloxy, heptyloxy and octyloxy groups), aryloxy groups (for example, phenoxy group), alkoxycarbonyl groups (for example, methoxycarbonyl, ethoxycarbonyl, propoxycarbonyl, butoxycarbonyl, pentyloxycarbonyl and heptyloxycarbonyl groups), aryloxycarbonyl groups (for example, phenoxycarbonyl group), alkoxycarbonylamino groups (for example, butoxycarbonylamino and hexyloxycarbonylamino groups), alkylthio groups (for example, methylthio, ethylthio, propylthio, butylthio, pentylthio, heptylthio and octylthio groups), arylthio groups (for example, phenylthio group), alkylsulfonyl groups (for example, methylsulfonyl, ethylsulfonyl, propylsulfonyl, butylsulfonyl, pentylsulfonyl, heptylsulfonyl and octylsulfonyl groups), amido groups (for example, acetamido, butylamido, hexylamido and laurylamido groups), and non-aromatic heterocyclic groups (for example, morpholyl and pyradinyl groups).

Preferable examples of the substituent in the substituted aryl group and substituted aromatic heterocyclic group include halogen atom, cyano group, carboxyl group, hydroxyl group, amino group, alkyl-substituted amino group, acyl group, acyloxy group, amido group, alkoxycarbonyl group, alkoxy group, alkylthio group, and alkyl group. In the alkylamino groups, alkoxycarbonyl groups, alkoxy groups and alkylthio groups, each alkyl moiety and alkyl group may further have a substituent. Examples of the substituent on the alkyl moiety and alkyl group include halogen atom, hydroxyl, carboxyl, cyano, amino, alkylamino group, nitro, sulfo, carbamoyl, alkylcarbamoyl group, sulfamoyl, alkylsulfamoyl group, ureido, alkylureido group, alkenyl group, alkynyl group, acyl group, acyloxy group, acylamino group, alkoxy group, aryloxy group, alkoxycarbonyl group, aryloxycarbonyl group, alkoxycarbonylamino group, alkylthio group, arylthio group, alkylsulfonyl group, amido group, and non-aromatic heterocyclic group. Preferable examples of the substituent on the alkyl moiety and alkyl group include halogen atom, hydroxyl, amino, alkylamino group, acyl group, acyloxy group, acylamino group, alkoxycarbonyl group, and alkoxy group.

Specific examples of the compound represented by formula (III) are shown below, but the invention is not meant to be limited to these.

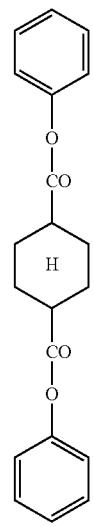

(III-1)

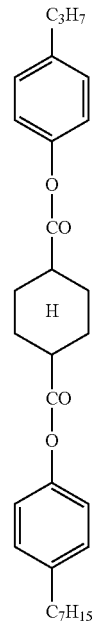

(III-2)

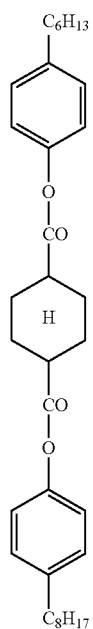
(III-3)
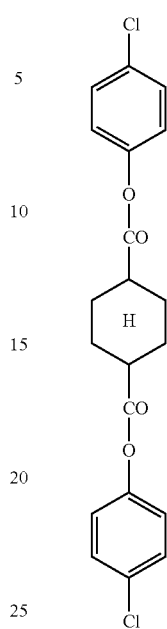
(III-5)
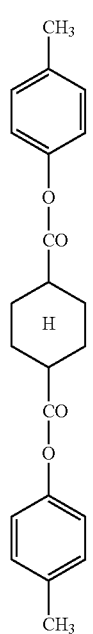
(III-4)
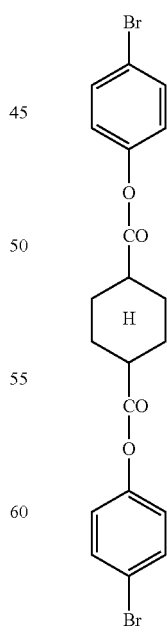
(III-6)

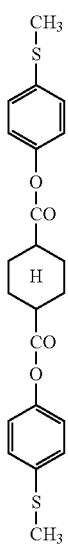 (III-7)
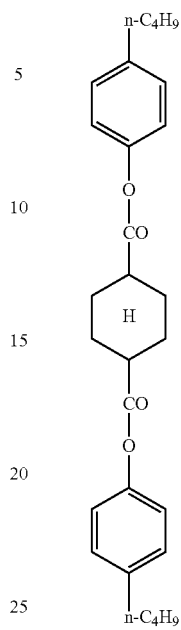 (III-9)
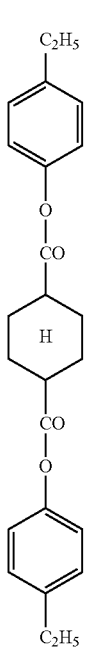 (III-8)
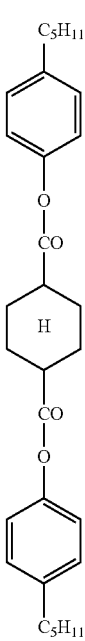 (III-10)

(III-11)
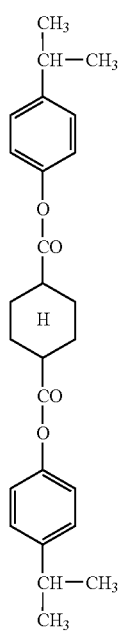
(III-12)
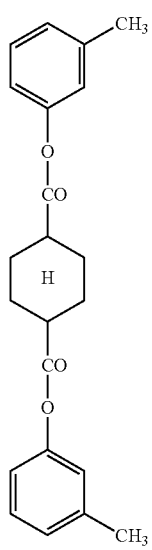
(III-13)
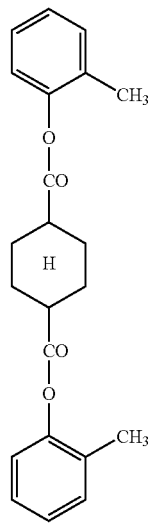
(III-14)
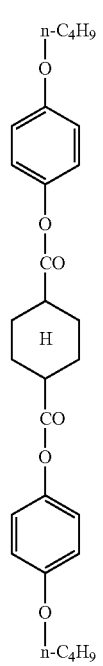

(III-15)
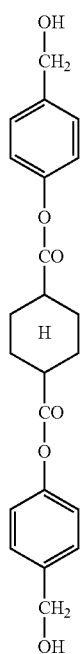
(III-16)
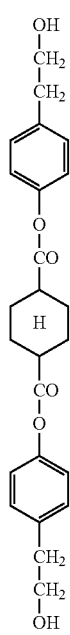
(III-17)
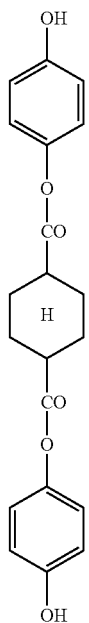
(III-18)
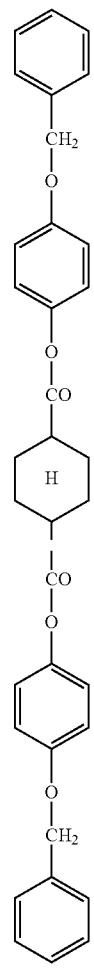

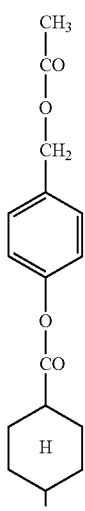
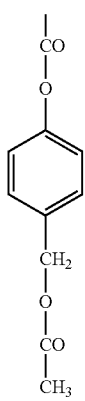
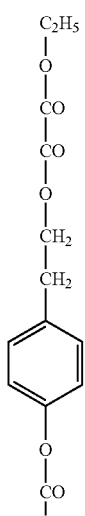
(III-19)
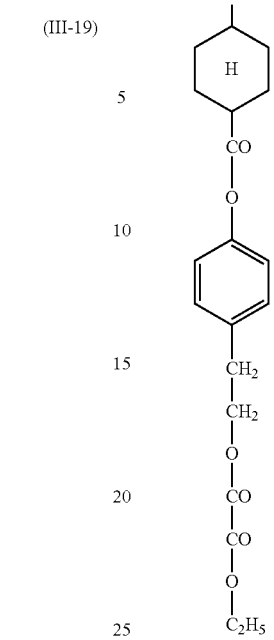
(III-20)
(III-21)
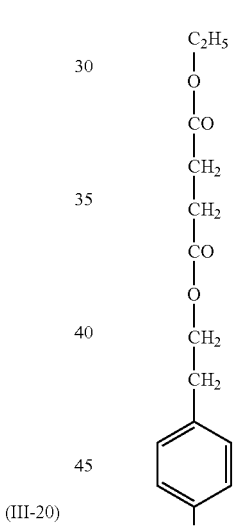
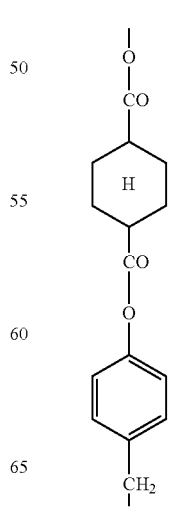

-continued
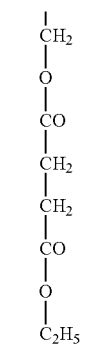
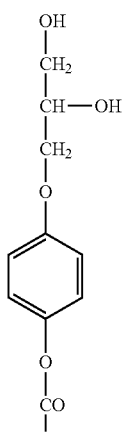
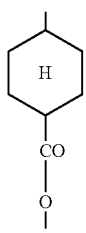
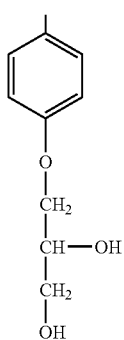
-continued
(III-22)
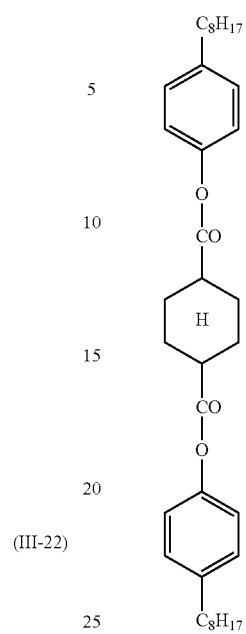
(III-23)
(III-24)
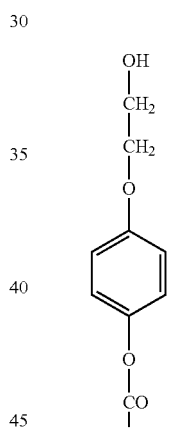
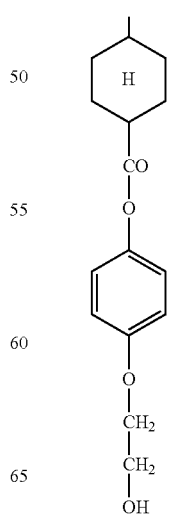

(III-25) 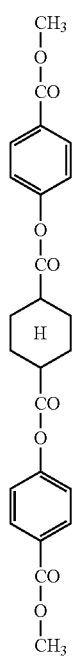
(III-27) 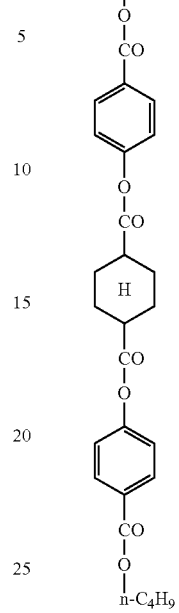
(III-26) 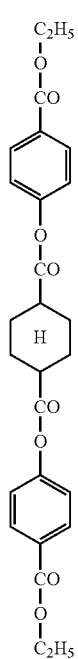
(III-28) 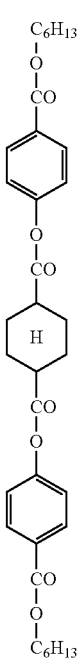

(III-29)
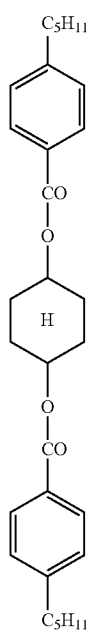
(III-30)
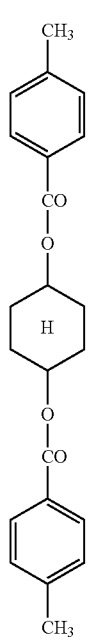
(III-31)
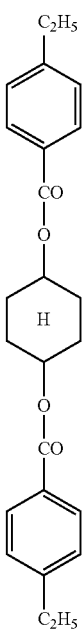
(III-32)
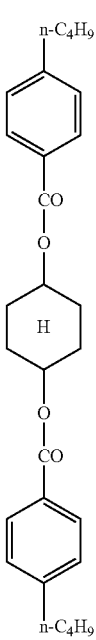

(III-33)
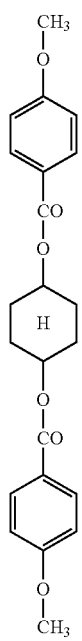
(III-34)
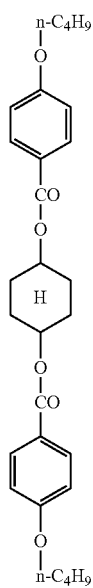
(III-35)
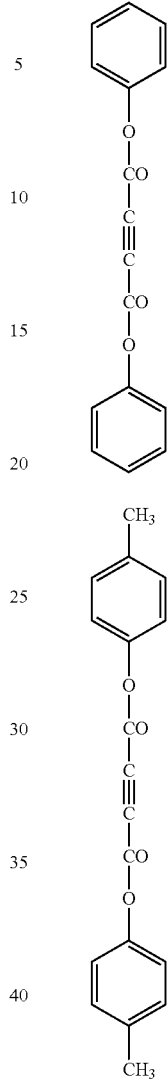
(III-36)
(III-37)
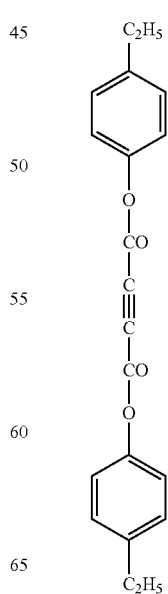

(III-38)
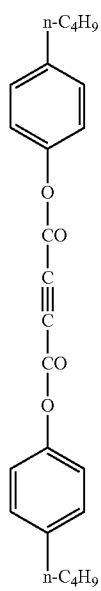
(III-40)
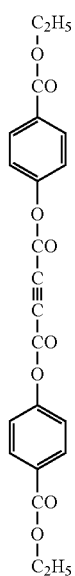
(III-39)
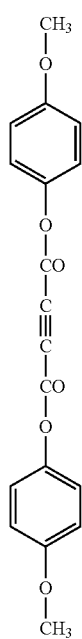
(III-41)
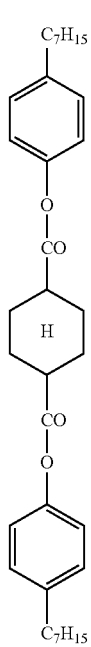

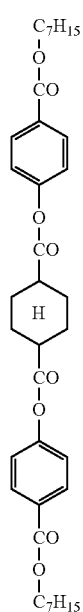 (III-42)
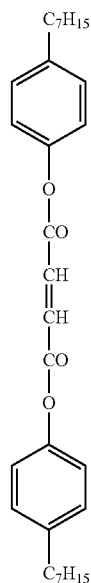 (III-44)
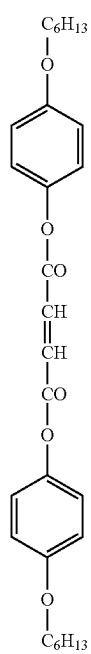 (III-43)
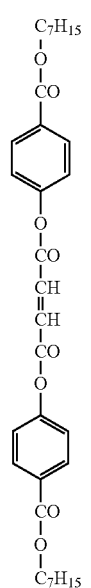 (III-45)

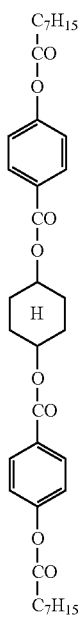 (III-46)
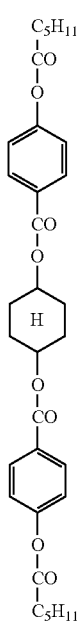 (III-47)
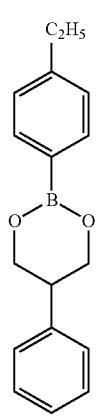 (III-48)
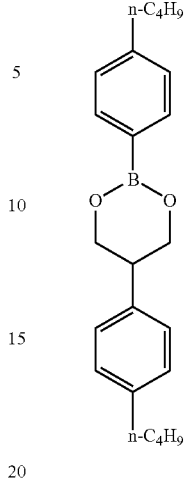 (III-49)
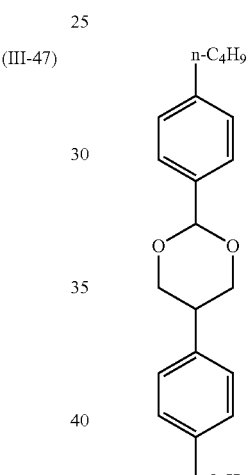 (III-50)
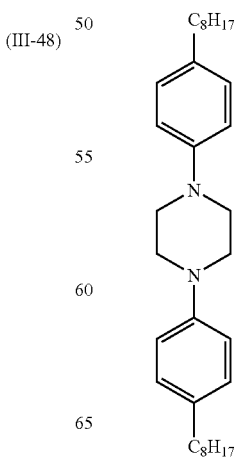 (III-51)

(III-52)

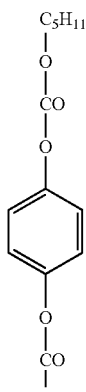

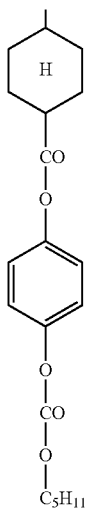

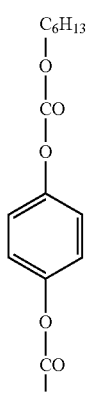

(III-53)

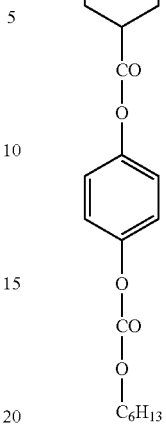

Other examples of the compound exhibiting a Re/Rth ratio of less than 0.35 or not less than 0.35, include compounds represented by formula (IV).

In the following, the compound represented by formula (IV) will be explained.

In formula (IV), $R^4$, $R^5$, $R^6$, $R^7$, $R^8$, and $R^9$ each independently represent a hydrogen atom or a substituent.

Examples of the substituent represented by $R^4$, $R^5$, $R^6$, $R^7$, $R^8$, or $R^9$ include an alkyl group (preferably an alkyl group having from 1 to 40, more preferably from 1 to 30, and particularly preferably from 1 to 20 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably an alkenyl group having from 2 to 40, more preferably from 2 to 30, and particularly preferably from 2 to 20 carbon atoms, e.g., vinyl, allyl, 2-butenyl, 3-pentenyl), an alkynyl group (preferably an alkynyl group having from 2 to 40, more preferably from 2 to 30, and particularly preferably from 2 to 20 carbon atoms, e.g., propargyl, 3-pentynyl), an aryl group (preferably an aryl group having from 6 to 30, more preferably from 6 to 20, and particularly preferably from 6 to 12 carbon atoms, e.g., phenyl, p-methylphenyl, naphthyl), a substituted or unsubstituted amino group (preferably an amino group having from 0 to 40, more preferably from 0 to 30, and particularly preferably from 0 to 20 carbon atoms, e.g., unsubstituted amino, methylamino, dimethylamino, diethylamino, anilino), an alkoxy group (preferably an alkoxy group having from 1 to 40, more preferably from 1 to 30, and particularly preferably from 1 to 20 carbon atoms, e.g., methoxy, ethoxy, butoxy), an aryloxy group (preferably an aryloxy group having from 6 to 40, more preferably from 6 to 30, and particularly preferably from 6 to 20 carbon atoms, e.g., phenyloxy, 2-naphthyloxy), an acyl group (preferably an acyl group having from 1 to 40, more preferably from 1 to 30, and particularly preferably from 1 to 20 carbon atoms, e.g., acetyl, benzoyl, formyl, pivaloyl), an alkoxycarbonyl group (preferably an alkoxycarbonyl group having from 2 to 40, more preferably from 2 to 30, and particularly preferably from 2 to 20 carbon atoms, e.g., methoxycarbonyl, ethoxycarbonyl), an aryloxycarbonyl group (preferably an aryloxycarbonyl group having from 7 to 40, more preferably from 7 to 30, and particularly preferably from 7 to 20 carbon atoms, e.g., phenyloxycarbonyl), an acyloxy group (preferably an acyloxy group having from 2 to 40, more preferably from 2 to 30, and particularly preferably from 2 to 20 carbon atoms, e.g., acetoxy, benzoyloxy), an acylamino group (preferably an acylamino group having from 2 to 40, more preferably from 2 to 30, and particularly preferably from 2 to 20 carbon atoms, e.g., acetylamino, benzoylamino), an alkoxycarbonylamino group (preferably an alkoxycarbonylamino group having from 2 to 40, more preferably from 2 to 30, and particularly preferably from 2 to 20 carbon atoms, e.g., methoxycarbonylamino), an aryloxycarbonylamino group (preferably an aryloxycarbonylamino group having from 7 to 40, more preferably from 7 to 30, and particularly preferably from 7 to 20 carbon atoms, e.g., phenyloxycarbonylamino), a sulfonylamino group (preferably a sulfonylamino group having from 1 to 40, more preferably from 1 to 30, and particularly preferably from 1 to 20 carbon atoms, e.g., methanesulfonylamino, benzenesulfonylamino), a sulfamoyl group (preferably a sulfamoyl group having from 0 to 40, more preferably from 0 to 30, and particularly preferably from 0 to 20 carbon atoms, e.g., it sulfamoyl, methylsulfamoyl, dimethylsulfamoyl, phenylsulfamoyl), a carbamoyl group (preferably a carbamoyl group having from 1 to 40, more preferably from 1 to 30, and particularly preferably from 1 to 20 carbon atoms, e.g., unsubstituted carbamoyl, methylcarbamoyl, diethylcarbamoyl, phenylcarbamoyl), an alkylthio group (preferably an alkylthio group having from 1 to 40, more preferably from 1 to 30, and particularly preferably from 1 to 20 carbon atoms, e.g., phenylthio), a sulfonyl group (preferably a sulfonyl group having from 1 to 40, more preferably from 1 to 30, and particularly preferably from 1 to 20 carbon atoms, e.g., mesyl, tosyl), a sulfinyl group (preferably a sulfinyl group having from 1 to 40, more preferably from 1 to 30, and particularly preferably from 1 to 20 carbon atoms, e.g., methanesulfinyl, benzenesulfinyl), a ureido group (preferably a ureido group having from 1 to 40, more preferably from 1 to 30, and particularly preferably from 1 to 20 carbon atoms, e.g., unsubstituted ureido; methylureido, phenylureido), a phosphoric acid amido group (preferably a phosphoric acid amido group having from 1 to 40, more preferably from 1 to 30, and particularly preferably from 1 to 20 carbon atoms, e.g., diethylphosphoric acid amido, phenylphosphoric acid amido), a hydroxy group, a mercapto group, a halogen atom (e.g., fluorine, chlorine, bromine, or iodine atom), a cyano group, a sulfo group, a carboxyl group, a nitro group, a hydroxamic acid group, a sulfino group, a hydrazino group, an imino group, a heterocyclic group (preferably a heterocyclic group having from 1 to 30, and more preferably from 1 to 12 carbon atoms; containing, as a hetero atom(s), for example, a nitrogen atom, an oxygen atom, or a sulfur atom, and specifically, e.g., imidazolyl, pyridyl, quinolyl, furyl, piperidyl, morpholino, benzoxazolyl, benzimidazolyl, benzothiazolyl, and 1,3,5-triazinyl can be exemplified), and a silyl group (preferably a silyl group having 3 to 40, more preferably 3 to 30, and particularly preferably 3 to 24 carbon atoms, e.g. trimethylsilyl, triphenylsilyl). These substituents may further be substituted by any of these groups or atoms. When there are two or more substituents, they may be the same or different. The substituents may bond together, to form a ring, if possible.

Preferred examples of the substituent represented by $R^4$, $R^5$, $R^6$, $R^7$, $R^8$, or $R^9$, include an alkyl group, an aryl group, a substituted or unsubstituted amino group, an alkoxy group, an alkylthio group, or a halogen atom.

Specific examples of the compound represented by formula (IV) are shown below, but the present invention is not limited to these.

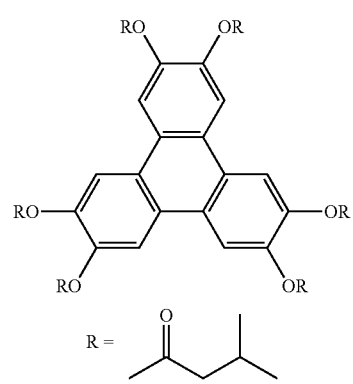

(IV-1)

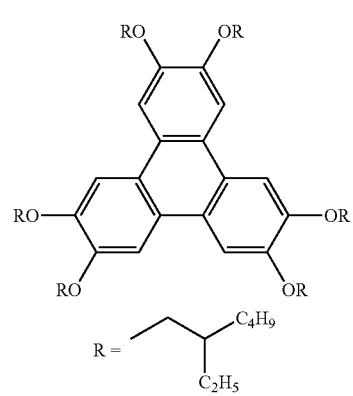

(IV-2)

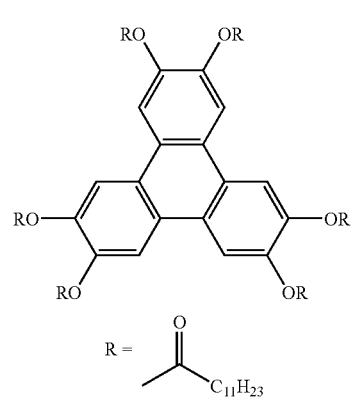

(IV-3)

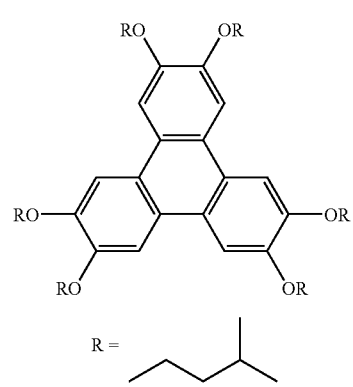

(IV-4)

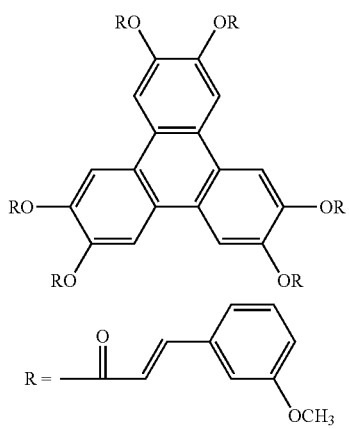
(IV-5)

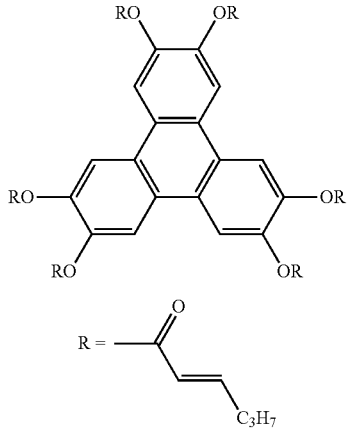
(IV-8)

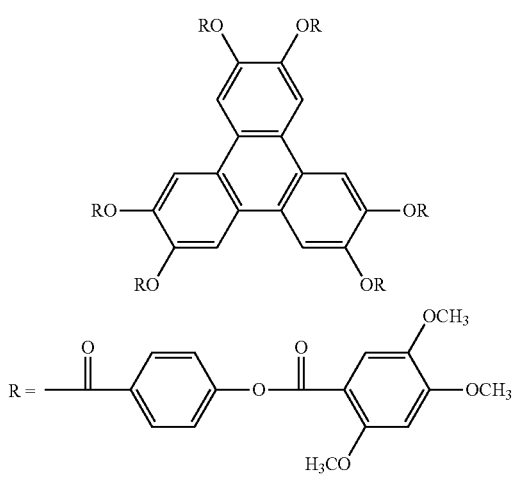
(IV-6)

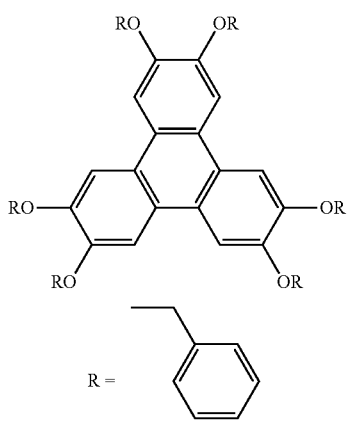
(IV-9)

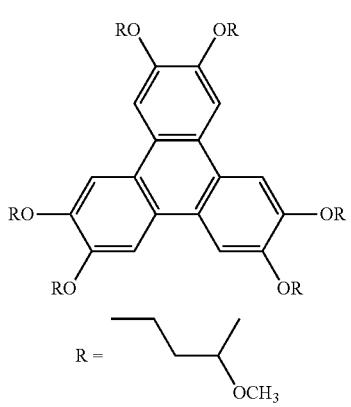
(IV-10)

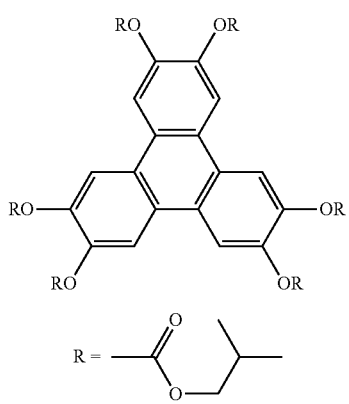
(IV-7)

The above compound can be used in an amount of generally 0.01 to 20 mass parts, preferably 1 to 10 mass parts, to 100 mass parts of the cellulose acetate.

The compound exhibiting a Re/Rth ratio of less than 0.35 and the compound exhibiting a Re/Rth ratio of not less than 0.35 are preferably mixed at a mixing ratio in terms of mass of the former compound to the later compound in the range of 1:9 to 9:1, more preferably of 2:8 to 8:2.

The compound represented by formula (IV) can be synthesized according to the synthetic method as described, for example, in JP-A-2005-134884.

(Production of Cellulose Acetate Film)

The cellulose acylate film is preferably prepared according to a solvent cast method. In the solvent cast method, a solution (dope) in which a cellulose acylate is dissolved in an organic solvent is used, to prepare a film.

The organic solvent preferably comprises a solvent selected from an ether having 3 to 12 carbon atoms, an alcohol having 1 to 6 carbon atoms, a ketone having 3 to 12 carbon atoms, an ester having 3 to 12 carbon atoms, and a halogenated hydrocarbon having 1 to 6 carbon atoms.

The ether, ketone, and ester each may have a cyclic structure. A compound having two or more functional groups of ether, ketone or ester (i.e. —O—, —CO— or —COO—) is also usable as the solvent. The organic solvent may have another functional group. When the organic solvent is a compound having two or more functional groups, the number of carbon atoms is in any of the above ranges defined for the compound having any of the functional groups.

Examples of the ether having 3 to 12 carbon atoms include diisopropyl ether, dimethoxymethane, dimethoxyethane, 1,4-dioxane, 1,3-dioxolane, tetrahydrofuran, anisole, and phenetole.

Examples of the alcohol having 1 to 6 carbon atoms include methanol, ethanol, 2-propanol, 1-butanol, and 2-butanol.

Examples of the ketone having 3 to 12 carbon atoms include acetone, methyl ethyl ketone, diethyl ketone, diisobutyl ketone, cyclohexanone, and methylcyclohexane.

Examples of the ester having 3 to 12 carbon atoms include ethyl formate, propyl formate, pentyl formate, methyl acetate, ethyl acetate, and pentyl acetate.

Examples of the organic solvent having two or more kinds of functional groups include 2-ethoxyethyl acetate, 2-methoxyethanol, and 2-butoxyethanol.

The halogenated hydrocarbon preferably has one or two carbon atoms, particularly preferably one carbon atom. The halogen in the halogenated hydrocarbon is preferably chlorine. The ratio that a hydrogen atom in the halogenated hydrocarbon is substituted with a halogen is preferably 25 to 75 mol %, more preferably 30 to 70 mol %, further preferably 35 to 65 mol %, most preferably 40 to 60 mol %. A typical halogenated hydrocarbon is methylene chloride.

Two or more kinds of the organic solvents may be mixed to use in combination. Examples of the solvent that can be preferably used in the present invention, include a mixed solvent of methylene chloride and methanol.

It is preferable that the cellulose acylate for use in the present invention is in a form of a solution in which cellulose acylate is dissolved in an organic solvent at a concentration of from 10 to 30% by mass, more preferably from 13 to 27% by mass, and particularly preferably from 15 to 25% by mass. The cellulose acylate concentration may be controlled to such a level, by controlling the concentration at the dissolution step. Alternatively, it is also possible that a solution of a low concentration (for example, from 9 to 14% by mass) is preliminarily prepared and then the concentration is controlled to the aforementioned high level in the subsequent concentrating step as will be described hereinafter. It is also possible that a cellulose acylate solution of a high concentration is preliminarily prepared and then various additives are added to give a cellulose acylate solution of a lowered concentration as mentioned in the above. Any method may be used without any problem so long as the cellulose acylate solution of the aforementioned concentration preferably in the present invention can be attained.

It is preferable in the present invention that a diluted cellulose acylate solution, that is obtained by diluting the cellulose acylate solution with the organic solvent of the same composition to give a concentration of from 0.1 to 5% by mass, has a cellulose acylate aggregate molecular weight of from 150,000 to 15,000,000, more preferably from 180,000 to 9,000,000. This aggregate molecular weight can be determined by a static light scattering method. It is preferable to make the solution to give an inertia square radius, which id determined at the same time, of from 10 to 200 nm, more preferably from 20 to 200 nm. It is also preferable to make the solution to give a second virial coefficient of from $-2 \times 10^{-4}$ to $+4 \times 10^{-4}$, more preferably from $-2 \times 10^{-4}$ to $+2 \times 10^{-4}$. Next, the definitions of the aggregate molecular weight, inertia square radium, and second virial coefficient as referred to herein will be illustrated.

These items can be measured by using a static light scattering method in accordance with the following procedures. Although the measurement is carried out in a dilute region as a matter of convenience in an measuring apparatus, these data reflect behaviors of the dope in the high concentration region according to the present invention. First, cellulose acylate is dissolved in a solvent to be used in the dope, to give solutions having concentrations of 0.1% by mass, 0.2% by mass, 0.3% by mass, and 0.4% by mass, respectively. To prevent water absorption, cellulose acylate having been dried at 120° C. for 2 hours is employed and weighed at 25° C. under 10% RH. Dissolution is carried out in accordance with the method employed in dissolving the dope (e.g. a room-temperature dissolution method, a cold dissolution method, a hot dissolution method).

Then, these solutions and solvents are filtered through a 0.2-μm filter made of Teflon (registered trademark). Then, static light scattering of each solution thus filtered is measured at 25° C. at from 30° to 140° at the intervals of 10°, by using a light scattering meter (Model DLS-700, trade name, manufactured by OTUKA ELECTRONICS CO., LTD.). The obtained data are then analyzed by the BERRY plot method. As the refractive index required in the analysis, use is made of the value of the solvent determined by using an ABBE refraction system. The concentration gradient (dn/dc) of the refractive index is measured with a differential refractometer (Model DRM-1021, trade name, manufactured by OTUKA ELECTRONICS CO., LTD.), by using the solvents and solutions employed in measuring light scattering.

Next, the preparation of a cellulose acylate solution (dope) that can be used in the present invention will be illustrated. The cellulose acylate is dissolved by an arbitrary method without particular limitation, i.e., by a room-temperature dissolution method, a cold dissolution method, a hot dissolution method, or a combination thereof. Regarding those, methods of preparing cellulose acylate solutions are described, for example, in JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-2-276830, JP-A-2000-273239, JP-A-11-71463, JP-A-04-259511, JP-A-2000-273184, JP-A-11-323017 and JP-A-11-302388. These techniques of dissolving cellulose acylate in organic solvents as described above are appropriately applicable in the present invention within the scope of the invention.

These techniques can be carried out, in particular for a system utilizing a non-chlorine-containing solvent, in accordance with the method described in detail in Japan Institute of Invention and Innovation Journal of Technical Disclosure No. 2001-1745 (Mar. 15, 2001, Japan Institute of Invention and Innovation), pages 22 to 25. Further, the cellulose acylate dope solution according to the present invention is usually concentrated and filtered, as described in detail in Japan Institute of Invention and Innovation Journal of Technical Disclosure No. 2001-1745 (Mar. 15, 2001, Japan Institute of Invention and Innovation), p. 25. In hot dissolution, a temperature not lower than the boiling point of the organic solvent to be employed is used in most cases, and the dissolution is performed under pressurized condition in such cases.

(Cellulose Derivative Film)

In the below, described will be the method of producing the optical compensation film of the present invention (herein also referred to as the cellulose acylate film, e.g. cellulose acetate film, of the present invention; and herein, the term cellulose acetate film may be utilized in place of the cellulose acylate film in some cases).

As a method and apparatus for producing the cellulose acylate film of the present invention, use can be made of the solvent cast film-forming method and solvent cast film-forming apparatus conventionally employed in forming cellulose triacetate film. A dope (a cellulose acylate solution) prepared in a dissolution machine (pot) is once stored in a storage pot, and, after defoaming, the dope is subjected to the final preparation. Then, the dope is discharged from a dope exhaust and fed into a pressure die via, for example, a pressure constant-rate gear pump whereby the dope can be fed at a constant flow rate at a high accuracy depending on a rotational speed. From a pipe sleeve (slit) of the pressure die, the dope is uniformly cast onto a metallic support continuously running in the casting section. At the peeling point where the metallic support has almost rounded in one cycle, the half-dried dope film (also called a web) is peeled from the metallic support.

The obtained web is clipped at both ends and dried by conveying with a tenter while maintaining the width at a constant level. Subsequently, it is conveyed with rolls in a dryer to terminate the drying, and then wound with a winder in a given length. Combination of the tenter and the rolls in the dryer may vary depending on the purpose. In the solvent cast film-forming method to produce a functional protective film for electronic displays or silver halide photographic light-sensitive materials, a coater is additionally employed in many cases, in addition to the solvent cast film-forming apparatus, so as to treat the film surface by providing, for example, an undercoat layer, an antistatic layer, an anti-halation layer or a protective layer. These production steps are described in detail in 'Hatsumei Kyokai Koukai Giho' (Journal of Technical Disclosure) (Technical Disclosure No. 2001-1745, published Mar. 15, 2001, Japan Institute of Invention and Innovation), pp. 25 to 30, and they are classified into casting (including cocasting), metal support, drying, releasing (peeling), stretching, etc.

In the present invention, the space temperature of the casting section is not particularly limited, but it is preferably −50° C. to 50° C., more preferably −30° C. to 40° C., and particularly preferably −20° C. to 30° C. In particular, a cellulose acylate solution that is cast at a low space temperature is instantaneously cooled on the support, thus increasing the gel strength and thereby holding the film, which contains an organic solvent. By so doing, it is possible to peel the cellulose acylate from the support in a short period of time, without evaporating the organic solvent, thus enabling high speed casting to be achieved. With regard to means for space cooling, normal air, nitrogen, argon, helium, etc. may be employed, and the means is not particularly limited. In this case, the humidity is preferably 0% RH to 70% RH, and more preferably 0% RH to 50% RH. Further, in the present invention, the temperature of the support of the casting section, in which the cellulose acylate solution is to be cast, is generally −50° C. to 130° C., preferably −30° C. to 25° C., and more preferably −20° C. to 15° C. To maintain the casting section at the temperature preferably in the present invention, a cooled gas may be introduced to the casting section, or a cooling device may be disposed in the casting section so as to cool the space. In this arrangement, it is important that attention is paid to preventing water from becoming attached, and this can be achieved by a method utilizing a dried gas.

Particularly preferred contents and casting of each layer in the present invention are as follows. That is, the cellulose acylate solution contains, at 25° C., at least one type of liquid or solid plasticizer at 0.1 to 20 mass % to the cellulose acylate, and/or at least one type of liquid or solid ultraviolet absorbing agent at 0.001 to 5 mass % to the cellulose acylate, and/or at least one type of solid fine-particulate powder having an average particle diameter of 5 to 3,000 nm at 0.001 to 5 mass % to the cellulose acylate, and/or at least one type of fluorine-containing surfactant at 0.001 to 2 mass % to the cellulose acylate, and/or at least one type of peeling agent at 0.0001 to 2 mass % to the cellulose acylate, and/or at least one type of degradation inhibitor at 0.0001 to 2 mass % to the cellulose acylate, and/or at least one type of optical anisotropy control agent at 0.1 to 15 mass % to the cellulose acylate, and/or at least one type of infrared absorbing agent at 0.1 to 5 mass % to the cellulose acylate, and a cellulose acylate film prepared using the cellulose acylate solution above.

In the casting step, a single type of a cellulose acylate solution may be cast to form a monolayer, or two or more types of cellulose acylate solutions may be simultaneously or sequentially cocast. When two or more layers are formed in the casting step, the cellulose acylate solutions and the cellulose acylate film that are to be prepared from said solutions, are preferably provided in such a manner that: the chlorine-containing solvents in the respective layers have either the same or different compositions; the respective layers contain either a single type of additive or a mixture of two or more types of additives; the additives are placed in either the same or different layers; the solutions of the additive for the respective layers have either the same or different concentrations; aggregates or associations in the respective layers have either the same or different molecular weights; the solutions for the respective layers have either the same or different temperatures; the respective layers are either the same or different in coated amounts; the respective layers have either the same or different viscosities; the respective layers have either the same or different film thicknesses after drying; the states or distributions of a material present in the respective layers are either the same or different; the respective layers have either the same or different physical properties; or the respective layers have either uniform physical properties or different physical properties distributed between the layers.

In the cellulose acylate film, a plasticizer may be added, to improve the mechanical properties or increase the drying speed. As the plasticizer, a phosphoric acid ester or a carboxylic acid ester can be used. Examples of the phosphate ester include triphenyl phosphate (TPP) and tricresyl phosphate (TCP).

Representative examples of the carboxylate ester include a phthalate and a citrate. Examples of the phthalate include dimethyl phthalate (DMP), diethyl phthalate (DEP), dibutyl phthalate (DBP), dioctyl phthalate (DOP), diphenyl phthalate (DPP), and diethylhexyl phthalate (DEHP). Examples of the citrate include triethyl O-acetylcitrate (OACTE), and tributyl O-acetylcitrate (OACTB). Examples of other carboxylate ester include butyl oleate, methyl acetyl ricinoleate, dibutyl sebacate, and various trimellitic acid esters. A phthalate-series plasticizer (e.g. DMP, DEP, DBP, DOP, DPP, or DEHP) can be preferably used, and DEP and DPP are particularly preferred.

The amount of the plasticizer to be added is preferably from 0.1 to 25 mass %, more preferably from 1 to 20 mass %, and most preferably 3 to 15 mass %, to the amount of the cellulose ester.

To the cellulose acetate film, a deterioration inhibitor (for example, an antioxidant, a peroxide decomposer, a radical inhibitor, a metal deactivator, an acid trapping agent, an amine) may be added. The deterioration inhibitor is described in JP-A-3-199201, JP-A-5-197073, JP-A-5-194789, JP-A-5-271471, and JP-A-6-107854. The amount of the deterioration inhibitor to be added is preferably from 0.01 to 1 mass %, more preferably from 0.01 to 0.2 mass %, to the solution (dope) to be prepared, from the viewpoint of exhibiting the effect of deterioration inhibitor or preventing the deterioration inhibitor from bleeding out onto the film surface. Examples of a particularly preferable deterioration inhibitor include butylated hydroxytoluene (BHT), and tribenzyl amines (TBA).

(Orientation (Stretching) of Cellulose Acylate Film)

The cellulose acetate film may be subjected to stretching to adjust the retardation. The stretch ratio is preferably 3 to 100%. As the stretching method, any method may be used within the scope of the present invention, but, in particular, a tenter stretching is preferably used from the viewpoint of in-plane uniformity. The width of the cellulose acylate film of the present invention is preferably at least 100 cm or more. The dispersion (scattering) of a Re value in the total width is preferably ±5 nm, and more preferably ±3 nm. Also, the dispersion of a Rth value is preferably ±10 nm, and more preferably ±5 nm. Also, each dispersion of Re value and Rth value in a longitudinal direction is preferably within the range of the dispersion in the transverse direction.

Also, the stretching may be carried out in the course of film-forming, or a roll of a raw film wound after film-forming may be stretched. In the former case, the raw film may be stretched in the state of the film containing a residual solvent (s). The amount of the residual solvent at the start of the stretching is preferably 2 to 50%. The amount of the residual solvent at the start of the stretching means the amount of residual solvent when both ends of a web (half-dried dope) starts to be fastened with a clip, in the case of a tenter stretching method. It is more preferable to start stretching when the amount of residual solvent is 5 to 50%, and it is particularly preferable to start stretching when the amount of residual solvent is 10 to 45%. The amount of residual solvent is calculated according to the following expression:

(Amount of residual solvent)=100×{(Amount of solvent in web)/(Total amount of the web)}

At that time, preferably, the film is stretched in a direction perpendicular to the longitudinal direction with conveying the film in the longitudinal direction so that the slow axis of the film be perpendicular to the longitudinal direction of the film.

As to the stretching temperature, a proper condition may be selected, according to the film thickness and the amount of residual solvent at the time of stretching.

In the case of stretching in the state that the film contain residual solvent, it is preferable to dry the film after stretched. As to a drying method, the film may be dried, according to the aforementioned film-forming method.

The thickness (dry film thickness) of the cellulose acetate film after stretched is generally 110 μm or less, preferably 40 to 110 μm, more preferably 60 to 110 μm, and most preferably 80 to 110 μm. This film thickness corresponds to the film thickness of the optical compensation sheet of the present invention.

(Wavelength Dispersion of Cellulose Acylate Film)

An example of performance required for an optical compensation sheet, can be mentioned forms of the wavelength dispersion of a Re retardation value and Rth retardation value. Because the optical compensation sheet works as a negative retarder to compensate a liquid crystal, which is a positive retarder, it is necessary that the Rth retardation value wavelength dispersion form of the optical compensation sheet be similar to the wavelength dispersion form of the liquid crystal, to compensate a polarizing light in the entire wavelength region of the visible light. At present, it is known that most of the wavelength dispersion form of a liquid crystal sealed in a liquid crystal cell is forward dispersion, and it is preferable that the Re retardation value and Rth retardation value wavelength dispersion forms of the optical compensation sheet be, respectively, a forward dispersion form. Specifically, a difference (Re700-Re400) between the Re retardation value (Re700) at a wavelength of 700 nm and the Re retardation value (Re400) at a wavelength of 400 nm is preferably −25 nm to 10 nm, more preferably −25 nm to 5 nm. Also, a difference (Rth700-Rth400) between the Rth retardation value (Rth700) at a wavelength of 700 nm and the Rth retardation value (Rth400) at a wavelength of 400 nm is preferably −50 nm to 20 nm, particularly preferably −50 nm to 10 nm.

(Humidity Dependency of Re Retardation Value and Rth Retardation Value)

The Re Retardation value and Rth retardation value are preferably those whose change due to the environmental humidity is small.

A difference between the Re retardation value and Rth retardation value measured in the environment of 25° C. and 10% RH and the Re retardation value and Rth retardation value measured in the environment of 25° C. and 80% RH, namely (Re10%-Re80% (25° C.)) and (Rth10%-Rth80% (25° C.)) are also preferably small, and these values are preferably within 25 nm and within 70 nm, respectively. Also, it is more preferable that (Re10%-Re80% (25° C.)) be within 15 nm, and (Rth10%-Rth80% (25° C.)) be within 50 nm, and it is particularly preferable that (Re10%-Re80% (25° C.)) be within 10 nm, and (Rth10%-Rth80% (25° C.)) be within 40 nm.

(Moisture Permeability)

In the present invention, the moisture permeability of the cellulose acylate film may be found in the following manner: For example, the humidity of a 70-mmφ sample is controlled in the condition of 25° C. and 90% RH for 24 hours, and the sample is then subjected to a moisture permeability tester (trade name: KK-709007, manufactured by Toyo Seiki Seisaku-sho, Ltd.), to calculate a water content per unit area ($g/m^2$), according to JIS Z-0208, by using the following expression:

(Moisture permeability)=(Mass after moisture conditioning)−(Mass before moisture conditioning)

The moisture permeability of the film as measured in the aforementioned manner, is preferably 20 $g/m^2 \cdot 24$-hr to 250 $g/m^2 \cdot 24$-hr, and particularly preferably 20 $g/m^2 \cdot 24$-hr to 230 $g/m^2 \cdot 24$-hr.

(Rate of Dimensional Change)

In the present invention, the rate of dimensional change may be found, for example, in the following manner: Each three test pieces of width 30 mm and length 120 mm are cut from a sample, in the longitudinal (MD) and transverse (TD) directions of said sample, respectively. A 6-mm (I) hole is punched in each end of the test piece at an interval of 100 mm by using a punch. The humidity of the test piece is controlled in a room kept at a temperature of 23±3° C. under a relative humidity of 65±5% for 2 hours or more. The full scale (L 1) of the distance between these punched holes is measured, using an automatic pin gauge (manufactured by Shinto Scientific Co., Ltd.), to the minimum scale of the order of 1/1,000 mm. Then, the test piece is hung in a thermostat kept at 90° C.±1° C., to carry out heat treatment for 24 hours. The humidity of the test piece is controlled in a room kept at 23±3° C. under a relative humidity of 65±5% for 2 hours or more. Then, the distance ($L^2$) between the punched holes after the heat treatment is measured by the automatic pin gauge, to calculate a dimensional change, according to the following expression:

Rate of dimensional change=$\{(L1-L2)/L1\} \times 100$

The rate of dimensional change of the film of the present invention as measured in the aforementioned manner, is preferably 0.5% or less, more preferably 0.3% or less.

(Rate of Dimensional Change Under High Humidity)

In the present invention, the rate of dimensional change under high humidity may be found, for example, in the following manner: Each three test pieces of width 30 mm and length 120 mm are cut from a sample, in the longitudinal (MD) and transverse (TD) directions of said sample, respectively. A 6-mm (I) hole is punched in each end of the test piece at an interval of 100 mm by using a punch. The humidity of the test piece is controlled in a room kept at a temperature of 23±3° C. under a relative humidity of 65±5% for 2 hours or more. The full scale (L1) of the distance between these punched holes is measured, using an automatic pin gauge (manufactured by Shinto Scientific Co., Ltd.), to the minimum scale of the order of 1/1,000 mm. Then, the test piece is hung in a thermohygrostat kept at 60° C.±1° C. under a relative humidity of 90±5%, to carry out heat treatment for 24 hours. The humidity of the test piece is controlled in a room kept at 23±3° C. under a relative humidity of 65±5% for 2 hours or more. Then, the distance (L3) between the punched holes after the heat treatment is measured by the automatic pin gauge, to calculate a dimensional change under high humidity, according to the following expression:

Rate of dimensional change=$\{(L1-L3)/L1\} \times 100$

The dimensional changes in 90° C. dry conditions and in 60° C./90% RH conditions as measured in the aforementioned manner, are both preferably to be small, and they are preferably within −0.2%, more preferably within −0.15%.

(Surface Treatment of Cellulose Acetate Film)

To attain the surface energy of the cellulose acetate film within the range of 55 to 75 mN/m, it is preferable to carry out a surface treatment. Examples of the surface treatment include a saponification treatment, a plasma treatment, a flame treatment, and an ultraviolet radiation treatment. The saponification treatment includes an acid saponification treatment and an alkali saponification treatment. The plasma treatment includes a corona discharge treatment and a glow discharge treatment. To retain the flatness of the film, the temperature of the cellulose acetate film in the surface treatment is kept to be preferably lower than the glass transition temperature (Tg), specifically 150° C. or less. The surface energy of the cellulose acetate film after the surface treatment is preferably 55 to 75 mN/m.

The glow discharge treatment may be a treatment with low-temperature plasma (thermal plasma) generated in a low-pressure gas of $10^{-3}$ to 20 Torr. A treatment with plasma under the atmospheric pressure is also preferable. A plasma excitation gas is a gas, which can be excited to plasma under conditions as described above, and examples thereof include argon, helium, neon, krypton, xenon, nitrogen, carbon dioxide, flons e.g. tetrafluoromethane, and a mixture thereof. Details thereof are described in "Kokai Giho of Japan Institute of Invention & Innovation" (Kogi No. 2001-1745, published on Mar. 15, 2001), pp. 30-32. In the plasma treatment under the atmospheric pressure, to which attention has been paid in recent years, for example, a radiating energy of 20 to 500 kGy is used under a condition of 10 to 1,000 keV, and preferably a radiating energy of 20 to 300 kGy is used under a condition of 30 to 500 keV. Among these treatments, an alkali saponifying treatment is particularly preferable, which treatment is quite effective as the surface treatment for the cellulose acylate film.

The alkali saponifying treatment is preferably conducted, by directly immersing the cellulose acylate film into a bath of a saponifying solution, or by applying a saponifying solution onto the cellulose acylate film. Examples of the application method include a dip coating method, a curtain coating method, an extrusion coating method, a bar coating method, and an E-type coating method. As the solvent in the alkali saponifying treatment coating solution, it is preferable to employ a solvent, which has an excellent wettability appropriate for applying the saponifying solution to a transparent support, and which can hold a favorable surface state without forming any irregularity on the transparent support surface. More specifically, it is preferable to use an alcoholic solvent, and isopropyl alcohol is particularly preferable. It is also possible to employ an aqueous solution of a surfactant as the solvent. As the alkali in the alkali-saponification coating solution, it is preferable to use an alkali soluble in the above-described solvent, and KOH or/and NaOH is further preferable. It is preferable that the saponification coating solution has a pH value of 10 or higher, more preferably 12 or higher. Regarding the reaction conditions, it is preferable to perform the alkali saponification at room temperature for 1 second or longer but 5 minutes or shorter, more preferably for 5 seconds or longer but 5 minute or shorter, and particularly preferably for 20 seconds or longer but 3 minutes or shorter. After the completion of the alkali saponification reaction, it is preferable to wash with water; or wash with an acid and then wash with water, the surface applied the saponifying solution.

The surface energy of the solid obtained by these methods can be measured by the contact angle method, the wet heating method, or the adsorption method, as described in "The basic theory and application of wetting", published by Realize Co., Ltd, Dec. 10, 1989. In the case of the cellulose acetate film of the present invention, the contact angle method is preferred. In that method, specifically, two solutions having known surface energies are dropped onto the cellulose acetate film. Then, the contact angle of each drop can be measured, and the surface energy of the film can be determined by calculation from the measured contact angles. The contact angle is defined to be an angle which is formed by a tangent line and the film surface, the tangent line being a line tangent to the curve of the droplet, which line is drawn at the point where the droplet surface intersects the film surface, and the contact angle being the angle at the droplet side.

It is possible to obtain a cellulose acetate film whose surface energy is 55 to 75 mN/m, by carrying out the above surface treatment of the cellulose acetate film. By using this cellulose acetate film as a transparent protective film of a polarizing plate, the adhesion of a polarizing film to the cellulose acetate film can be improved. Also, when the cellulose acetate film of the present invention is used in an OCB mode liquid crystal display device, the optical compensation sheet of the present invention may be provided with an stretched film formed on the cellulose acetate film and with an optically anisotropic layer containing a disk-like compound or a rod-like liquid crystal compound on the stretched film. The optically anisotropic layer is formed by orientating the disk-like compound (or the rod-like liquid crystal compound) on the orientated film, to fix the orientation state. When the optically anisotropic layer is formed on the cellulose acetate film in this manner, it is conventionally necessary to form a gelatin undercoat layer between the cellulose acetate film and the orientated film, to secure the adhesion between the both. Contrary to the above, it is unnecessary to form such a gelatin undercoat layer, by using the cellulose acetate film of the present invention, which has a surface energy of 55 to 75 mN/m.

(Polarizing Plate)

The polarizing plate comprises a polarizing film (a polarizer) and two transparent protective films disposed on the both sides of the polarizing film. The optical compensation sheet constituted by using the aforementioned cellulose acylate film can be used as at least one of the protective films. A usual cellulose acetate film may be used as the other protective film.

Examples of polarizing films include iodine-based polarizing films, and dye- or polyene-based polarizing films using dichromatic dyes. Iodine-based polarizing films and dye-based polarizing films are generally produced, using polyvinyl alcohol-based films.

The slow axis of the optical compensation sheet comprising the cellulose acylate film is preferably placed substantially parallel to the transmission axis of the polarizing film. Herein, the term "the slow axis of the optical compensation sheet comprising a cellulose acylate film and the transmission axis of the polarizing film adjacent to said cellulose acylate film are arranged in substantially parallel to each other" means that an angle formed by the slow axis and transmission axis is generally within ±2°, preferably within ±1°, to the axis direction.

(Antireflection Layer)

An antireflection layer is preferably provided on a transparent protective film that is placed on one side of the polarizing plate opposite to a liquid crystal cell. Particularly in the present invention, the antireflection layer is preferably a laminate of at least a light scattering layer and a low-refractive-index layer provided in this order on the transparent protective film, or a laminate of a middle-refractive-index layer, a high-refractive-index layer and a low-refractive-index layer provided in this order on the transparent protective film.

(Liquid Crystal Display Device)

The polarizing plate using the optical compensation sheet of the present invention can be used advantageously in a liquid crystal display device. The polarizing plate of the present invention may be used in liquid crystal cells driven in various displaying modes. As for the display modes, proposed are various modes, for example, TN (Twisted Nematic), IPS (In-Plane Switching), FLC (Ferroelectric Liquid Crystal), AFLC (Anti-ferroelectric Liquid Crystal), OCB (Optically Compensatory Bend), STN (Supper Twisted Nematic), VA (Vertically Aligned), and HAN (Hybrid Aligned Nematic). Among these, the present invention may be preferably applied to OCB-mode or VA-mode.

The present invention will be described in more detail based on the following examples, but the invention is not intended to be limited to these.

EXAMPLES

Example 1

Preparation of Cellulose Acylate Film

The components in the following composition ratio were poured into a mixing tank, and the resultant was stirred under heating, to dissolve the components each other, thereby to prepare a cellulose acetate solution.

| (Composition of the cellulose acetate solution) | |
|---|---|
| Cellulose acetate (acetylation degree: 60.9%) | 100 mass parts |
| Triphenyl phosphate (plasticizer) | 7.8 mass parts |
| Biphenyldiphenyl phosphate (plasticizer) | 3.9 mass parts |
| Methylene chloride (first solvent) | 318 mass parts |
| Methanol (second solvent) | 47 mass parts |
| Silica (particle diameter: 0.2 μm) | 0.1 mass parts |

Another mixing tank was charged with any of retardation controlling agents A and B, as shown in Table 2 below, 87 mass parts of methylene chloride, and 13 mass parts of methanol, and the resultant mixture was stirred under heating, to prepare retardation controlling agent solutions, respectively.

Any one of the retardation controlling agent solutions was admixed with the cellulose acetate solution, and the resultant mixture was thoroughly stirred, to prepare a dope. The amounts of the retardation controlling agents A and B to be added, to 100 mass parts of the cellulose acetate, are shown in Table 2. Further, Re/Rth ratios of the retardation controlling agents measured by the above-described method, are shown in Table 1.

The resulting dope was cast using a band casting machine, and the resulting film with a residual solvent content of 32% by mass at the stretching start time was laterally stretched at a stretch ratio of 26% with a tenter, under conditions of 130° C., followed by drying at 130° C. for 20 minutes, to give a cellulose acetate film (92 μm in thickness). With respect to the thus-prepared cellulose acetate film, Re retardation value and Rth retardation value at wavelength 590 nm were measured, using KOBRA 21 ADH (trade name, manufactured by Oji Scientific Instruments). The results are shown in Table 2.

TABLE 1

| Re/Rth ratio of retardation-controlling agent | | | |
|---|---|---|---|
| Retardation-controlling agent | Re (nm) | Rth (nm) | Re/Rth |
| Compound (I-421) | 20 | 114 | 0.18 |
| Compound (II-21) | 34 | 145 | 0.23 |
| Compound (III-23) | 28 | 72 | 0.39 |
| Compound (IV-1) | 25 | 138 | 0.18 |
| Compound (IV-4) | 26 | 70 | 0.37 |

TABLE 2

| | Properties of the prepared films | | | | | | |
|---|---|---|---|---|---|---|---|
| | Retardation-controlling agent | | | | | | |
| Example No. | Controlling agent A | Amount of addition of A (mass %) | Controlling agent B | Amount of addition of B (mass %) | Re (nm) | Rth (nm) | Re/Rth |
| Example 1 | Compound (I-421) | 2 | Compound (III-23) | 2 | 60 | 128 | 0.47 |

TABLE 2-continued

Properties of the prepared films

| Example No. | Retardation-controlling agent | | | | Re (nm) | Rth (nm) | Re/Rth |
|---|---|---|---|---|---|---|---|
| | Controlling agent A | Amount of addition of A (mass %) | Controlling agent B | Amount of addition of B (mass %) | | | |
| Example 2 | Compound (I-421) | 5 | Compound (III-23) | 2 | 75 | 190 | 0.39 |
| Example 3 | Compound (II-21) | 2 | Compound (III-23) | 2 | 72 | 170 | 0.42 |
| Example 4 | Compound (II-21) | 3 | Compound (III-23) | 2 | 90 | 180 | 0.5 |
| Example 5 | Compound (IV-1) | 2 | Compound (III-23) | 2 | 66 | 182 | 0.36 |
| Example 6 | Compound (I-421) | 2 | Compound (IV-4) | 2 | 54 | 132 | 0.41 |
| Comparative example 1 | Compound (I-421) | 2 | None | 0 | 24 | 115 | 0.21 |
| Comparative example 2 | Compound (I-421) | 6 | None | 0 | 38 | 190 | 0.02 |
| Comparative example 3 | Compound (II-21) | 2 | None | 0 | 43 | 152 | 0.28 |
| Comparative example 4 | Compound (II-21) | 3 | None | 0 | 56 | 201 | 0.28 |
| Comparative example 5 | Compound (III-23) | 2 | None | 0 | 34 | 75 | 0.44 |
| Comparative example 6 | Compound (IV-1) | 2 | None | 0 | 26 | 142 | 0.18 |
| Comparative example 7 | Compound (IV-4) | 2 | None | 0 | 26 | 73 | 0.36 |

As can be understood from Table 2, when the compound represented by formula (I) or (II) was used singly, Re was possible to be made large, but Rth was also made large at the same time. Further, when the compound represented by formula (III) was used singly, Rth did not become large, but Re could not be made large, and the range of Re and Rth could not be freely set. Contrary to the above, according to the present invention, the use of a combination of the compounds different in Re/Rth ratios each other allowed to give the optical compensation films with desired Re values (60 to 90 nm) and desired Rth values (128 to 190 nm).

Further, the compounds represented by formula (IV) is classified into two types: the first type includes (IV-1), which behaves in a manner similar to the compound represented by formula (I) or (II); and the second type includes (IV-4), which behaves in a manner similar to the compound represented by formula (III). Similar to the above, although single use of only one type of the above two gave Re and Rth adjusted insufficiently, a combined use of these two types of the compounds represented by formula (IV) gave an optical compensation film, in which Re and Rth were adjusted in their respective preferable ranges.

Further, these films were processed into polarizing plates, which were used for optical compensation. As a result, optical compensation could be easily performed on a wide variety types of liquid crystal display devices.

INDUSTRIAL APPLICABILITY

The optical compensation sheet of the present invention is preferable to be applied in a wide variety types of liquid crystal display devices in a simple structure, without increasing the number of components in the polarizing plate utilized in said display devices.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. An optical compensation sheet, comprising a cellulose acylate film that contains 1 to 20 parts by mass of a retardation controlling agent, to 100 parts by mass of a cellulose acylate, wherein the retardation controlling agent comprises at least two compounds different in Re/Rth ratios from each other;
wherein one of the at least two compounds contained in the retardation controlling agent is selected from the group consisting of formulas (I), (II) and (IV) and exhibits a Re/Rth ratio of less than 0.35, and the other is selected from the group consisting of formulas (III) and (IV) and exhibits a Re/Rth ratio of not less than 0.35;

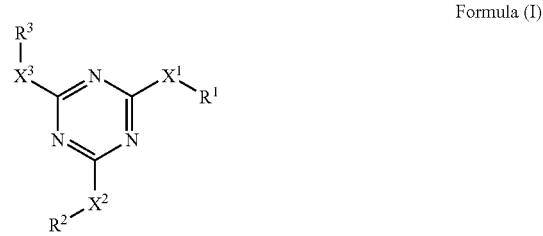

Formula (I)

wherein in Formula (I), $X^1$ represents a single bond, $-NR^4-$, $-O-$, or $-S-$; $X^2$ represents a single bond, $-NR^5-$, $-O-$, or $-S-$; $X^3$ represents a single bond, $-NR^6-$, $-O-$, or $-S-$; $R^1$, $R^2$ and $R^3$ each independently represent an alkyl group, an alkenyl group, an aryl group, or a heterocyclic group; and $R^4$, $R^5$ and $R^6$ each independently represent a hydrogen atom, an alkyl group, an alkenyl group, an aryl group, or a heterocyclic group;

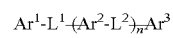

Formula (II)

wherein in Formula (II), $Ar^1$, $Ar^2$, and $Ar^3$ each independently represent an aryl group or an aromatic heterocyclic group; $L^1$ and $L^2$ each independently represent a single bond or a divalent linking group; n represents an integer of 3 or more; and a plurality of the $Ar^2$ moieties may be the same or different, and a plurality of the $L^2$ moieties may be the same or different;

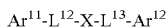  Formula (III)

wherein in Formula (III), $Ar^{11}$ and $Ar^{12}$ each independently represent an aromatic group; $L^{12}$ and $L^{13}$ each independently represent a divalent linking group selected from the group consisting of an alkylene group, —O—, —CO—, and a combination thereof; and X represents 1,4-cyclohexylene, vinylene, or ethynylene;

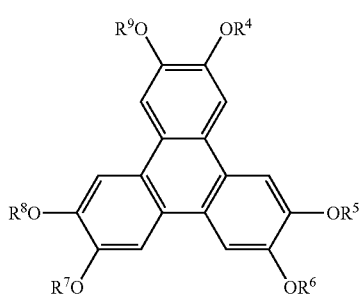 Formula (IV)

wherein in Formula (IV), $R^4$, $R^5$, $R^6$, $R^7$, $R^8$, and $R^9$ each independently represent a hydrogen atom or a substituent.

2. The optical compensation sheet as claimed in claim 1, wherein the optical compensation sheet comprises a cellulose acylate film stretched at a stretch ratio of 3 to 100%.

3. The optical compensation sheet as claimed in claim 1, wherein the content of the two compounds contained in the retardation controlling agent is 1 to 20 parts by mass in sum, to 100 parts by mass of the cellulose acylate.

4. The optical compensation sheet as claimed in claim 1, wherein the compound exhibiting a Re/Rth ratio of less than 0.35 is represented by formula (I):

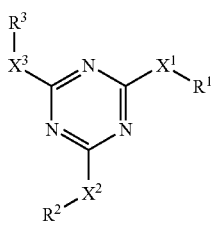 Formula (I)

wherein $X^1$ represents a single bond, —$NR^4$—, —O—, or —S—; $X^2$ represents a single bond, —$NR^5$—, —O—, or —S—; $X^3$ represents a single bond, —$NR^6$—, —O—, or —S—; $R^1$, $R^2$ and $R^3$ each independently represent an alkyl group, an alkenyl group, an aryl group, or a heterocyclic group; and $R^4$, $R^5$ and $R^6$ each independently represent a hydrogen atom, an alkyl group, an alkenyl group, an aryl group, or a heterocyclic group.

5. The optical compensation sheet as claimed in claim 1, wherein the compound exhibiting a Re/Rth ratio of less than 0.35 is represented by formula (II):

 Formula (II)

wherein $Ar^1$, $Ar^2$, and $Ar^3$ each independently represent an aryl group or an aromatic heterocyclic group; $L^1$ and $L^2$ each independently represent a single bond or a divalent linking group; n represents an integer of 3 or more; and a plurality of the $Ar^2$ moieties may be the same or different, and a plurality of the $L^2$ moieties may be the same or different.

6. The optical compensation sheet as claimed in claim 1, wherein the compound exhibiting a Re/Rth ratio of not less than 0.35 is represented by formula (III):

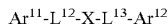 Formula (III)

wherein $Ar^{11}$ and $Ar^{12}$ each independently represent an aromatic group; $L^{12}$ and $L^{13}$ each independently represent a divalent linking group selected from the group consisting of an alkylene group, —O—, —CO—, and a combination thereof; and X represents 1,4-cyclohexylene, vinylene, or ethynylene.

7. The optical compensation sheet as claimed in claim 1, wherein the retardation controlling agent is a compound represented by formula (IV):

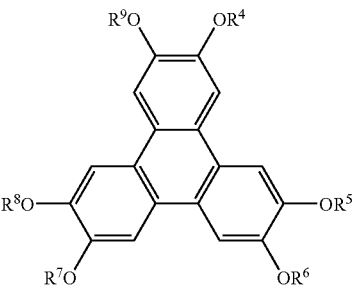 Formula (IV)

wherein $R^4$, $R^5$, $R^6$, $R^7$, $R^8$, and $R^9$ each independently represent a hydrogen atom or a substituent.

8. A liquid crystal display device, comprising a liquid crystal cell, and two polarizing plates disposed on both sides of the liquid crystal cell, said polarizing plate comprising a polarizing film and two transparent protective films disposed on both sides of the polarizing film,
wherein the optical compensation sheet as claimed in claim 1 is disposed between the liquid crystal cell and at least one polarizing film, and wherein a slow axis of the cellulose acylate film and a transmission axis of the polarizing film adjacent to the cellulose acylate film are arranged in substantially parallel to each other.

9. The optical compensation sheet as claimed in claim 1, wherein the difference between the Re/Rth ratios of the two compounds is 0.05 or more.

10. The optical compensation sheet as claimed in claim 1, wherein the compound that exhibits a Re/Rth ratio of less than 0.35 is a compound that exhibits a Re/Rth ratio of 0.18 or more but less than 0.35, and the compound that exhibits a Re/Rth ratio of not less than 0.35 is a compound that exhibits a Re/Rth ratio of 0.35 or more but 0.39 or less.

11. The optical compensation sheet as claimed in claim 1, wherein the cellulose acylate film has a Re retardation value of 60 to 120 nm and an Rth retardation value of 100 to 250 nm.

* * * * *